(12) United States Patent
Lin et al.

(10) Patent No.: US 11,487,739 B2
(45) Date of Patent: Nov. 1, 2022

(54) SYSTEM AND METHODS FOR DATA MODEL DETECTION AND SURVEILLANCE

(71) Applicant: NASDAQ, INC., New York, NY (US)

(72) Inventors: Xuyang Lin, Cambridge, MA (US);
Tudor Morosan, Toronto (CA);
Douglas Hamilton, Boston, MA (US);
Shihui Chen, Boston, MA (US);
Hyunsoo Jeong, Boston, MA (US);
Jonathan Rivers, Brighton, MA (US);
Leonid Rosenfeld, Brookline, MA (US)

(73) Assignee: NASDAQ, INC., New York, NY (US)

( * ) Notice: Subject to any disclaimer, the term of this patent is extended or adjusted under 35 U.S.C. 154(b) by 313 days.

(21) Appl. No.: 16/794,011

(22) Filed: Feb. 18, 2020

(65) Prior Publication Data
US 2020/0265032 A1 Aug. 20, 2020

Related U.S. Application Data

(60) Provisional application No. 62/807,526, filed on Feb. 19, 2019.

(51) Int. Cl.
| | | |
|---|---|---|
| *G06F 16/00* | (2019.01) | |
| *G06F 16/23* | (2019.01) | |
| *G06K 9/62* | (2022.01) | |
| *G06N 3/04* | (2006.01) | |
| *G06N 3/08* | (2006.01) | |

(52) U.S. Cl.
CPC ....... *G06F 16/2358* (2019.01); *G06K 9/6259* (2013.01); *G06N 3/0454* (2013.01); *G06N 3/088* (2013.01)

(58) Field of Classification Search
CPC .... G06F 16/254; G06F 16/285; G06F 16/906; G06F 21/57; G06F 8/65; G06F 16/95; G06F 17/10; G06F 17/18; G06F 2113/04; G06F 2119/06; G06F 30/36; G06N 5/025; G06N 7/005; G06Q 10/0637; G06Q 10/10; G06Q 10/101; G06Q 10/1095; G06Q 20/047; G06Q 20/10; G06Q 20/12;
(Continued)

(56) References Cited

U.S. PATENT DOCUMENTS

| | | |
|---|---|---|
| 2004/0193419 A1 | 9/2004 | Kimball et al. |
| 2005/0278322 A1 | 12/2005 | Fan et al. |
| 2009/0240644 A1 | 9/2009 | Boettcher et al. |
| 2014/0336960 A1* | 11/2014 | Haghighat-Kashani ..................... G06Q 50/06 702/60 |

(Continued)

FOREIGN PATENT DOCUMENTS

WO   2016/004073   1/2016

OTHER PUBLICATIONS

International Search Report and Written Opinion for International Application No. PCT/US2020/018731, 12 pages, dated Jul. 24, 2020.
(Continued)

*Primary Examiner* — Shyue Jiunn Hwa
(74) *Attorney, Agent, or Firm* — Nixon & Vanderhye P.C.

(57) ABSTRACT

A computer system is provided for monitoring and detecting changes in a data generating processes, which may be under a multi-dimensional and unsupervised setting. A target dataset is split into paired subgroups by a separator and one or more detectors are applied to detect changes, anomalies, inconsistencies, and the like between the paired subgroups. Metrics may be generated by the detector(s), which are then passed to an evaluating system.

20 Claims, 11 Drawing Sheets

(58) Field of Classification Search
CPC .... G06Q 20/20; G06Q 20/204; G06Q 20/306; G06Q 20/308; G06Q 20/321; G06Q 20/384; G06Q 20/386; G06Q 20/40; G06Q 20/407; G06Q 30/02; G06Q 30/06; G06Q 30/0601; G06Q 30/0605; G06Q 30/0631; G06Q 30/0643; G06Q 40/12; G06Q 50/01; G06T 17/00; G06T 19/00; G06T 2200/08; G06T 2210/16; G16H 10/60; H04L 63/1416; H04L 63/1425; H04Q 9/00

See application file for complete search history.

(56) References Cited

U.S. PATENT DOCUMENTS

| | | | |
|---|---|---|---|
| 2016/0252513 A1* | 9/2016 | Borrebaeck | C12Q 1/6886 506/9 |
| 2017/0099309 A1* | 4/2017 | Di Pietro | H04L 63/1425 |
| 2018/0275658 A1 | 9/2018 | Iandola et al. | |
| 2020/0184212 A1* | 6/2020 | Anthony Samy | G06V 20/95 |

OTHER PUBLICATIONS

Gulrajani Ishaan et al., "Improved Training of Wasserstein GANs", Proceedings of the 31$^{st}$ International Conference on Neural Information Processing Systems (NIPS 2017), pp. 1-20, Dec. 25, 2017.
International Preliminary Report on Patentability for International Application No. PCT/US2020/018731, 12 pages, dated Apr. 6, 2021.

\* cited by examiner

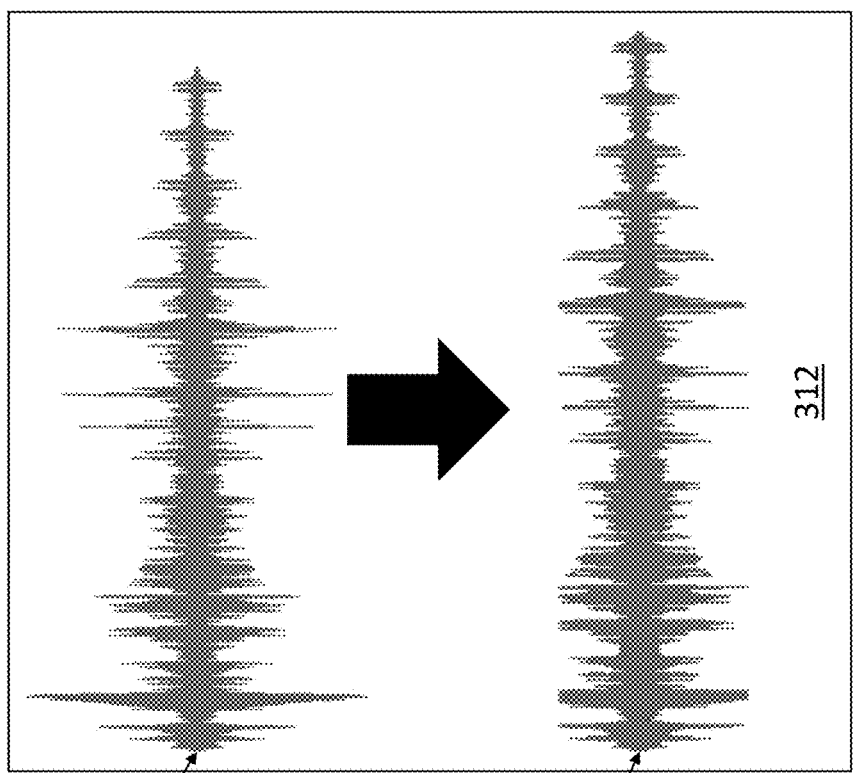

SYSTEM AND METHODS FOR DATA MODEL DETECTION AND SURVEILLANCE

CROSS REFERENCE(S) TO RELATED APPLICATION(S)

This application claims the benefit of U.S. Patent Application No. 62/807,526, filed Feb. 19, 2019, the entire contents being incorporated herein by reference.

TECHNICAL OVERVIEW

The technology described herein relates to analyzing outputted datasets. More particularly, the technology described herein relates to analyzing such datasets to determine whether there have been any changes or alternations (e.g., those that are significant) to the processing that produces the outputted dataset.

INTRODUCTION

There are many different types of services or processes that take input data (e.g., temperature readings from sensors located around the world), execute processing (e.g., weather modeling) on such data, and produce an output (e.g., a weather forecast) that is then passed onto consumers. One issue with such services is that the processing that occurs may be hidden or kept secret. In essence the service operates as a so-called "black box" in which consumers may know what input data is being used (e.g., the temperature readings) and may know the output data (e.g., the weather forecast), but may not know how the input data is transformed into the output data. The processing involved in the transformation from the input data to the output data may involve AI, machine learning, expert rules, or other processes.

Accordingly, it will be appreciated that new and improved techniques, systems, and processes are sought after in this area of technology.

SUMMARY

In certain example embodiments, a computer system is provided for monitoring and detecting changes in a data generating processes, which may be under a multi-dimensional and unsupervised setting. A target dataset (e.g., weather predictions or any other type of data) is split into paired subgroups by a separator and one or more detectors (e.g., pattern discovery) are applied (e.g., collectively) to detect changes, anomalies, inconsistencies, and the like within the dataset. Metrics may be generated by the detector(s), which are then passed to an evaluating system that then evaluates the results. For example, to generate a Boolean pass/fail decision and/or probabilistic results. Such processing may allow for assessing whether there are inconsistencies across datasets that have (allegedly) been processed by the same by a data source.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 3A-3C show examples of data that may be analyzed according to certain example embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a computer system for processing and analyzing datasets that are generated by data sources or data services is provided. The system can be used to detect whether there are statistically meaningful, significant, abnormal, and/or fraudulent changes within one or more datasets or signals that are provided to the computer system. The system can be used to assess datasets that are generated from so-called black-box processes where how inputs are transformed into the outputs is kept secret. The techniques discussed herein may allow for assessing or determining whether: 1) historical data has been altered (e.g., to improve output) for a service, 2) an underlying process or model (e.g., a black-box process) has been changed (e.g., to produce better output results) for the service, and/or 3) the performance of a process or model has changed (e.g., the predicative nature of a model has deteriorated).

Figure 1:
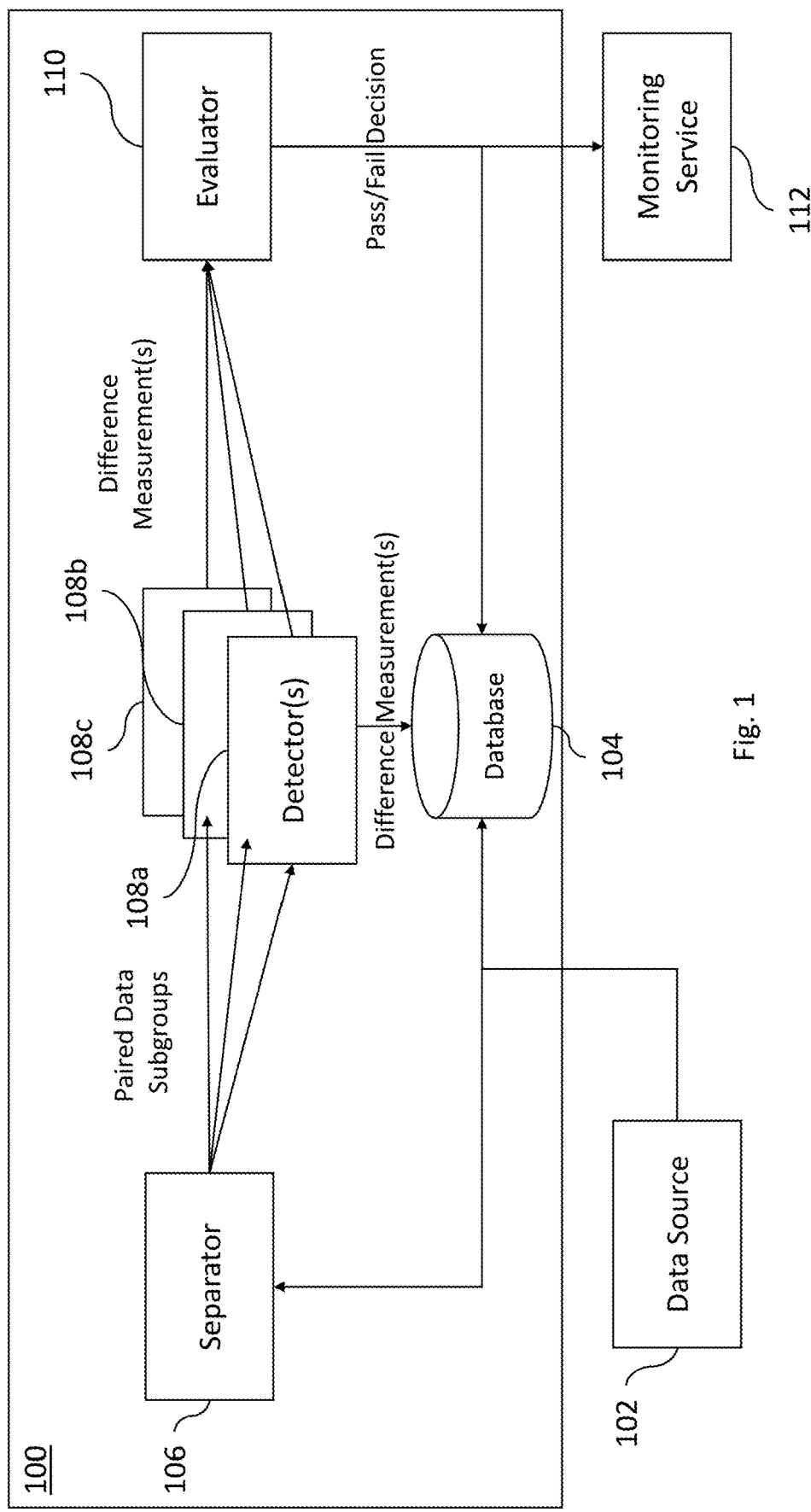
FIG. 1 shows an example system architecture for a data model detection system according to certain example embodiments.
Figure 2:
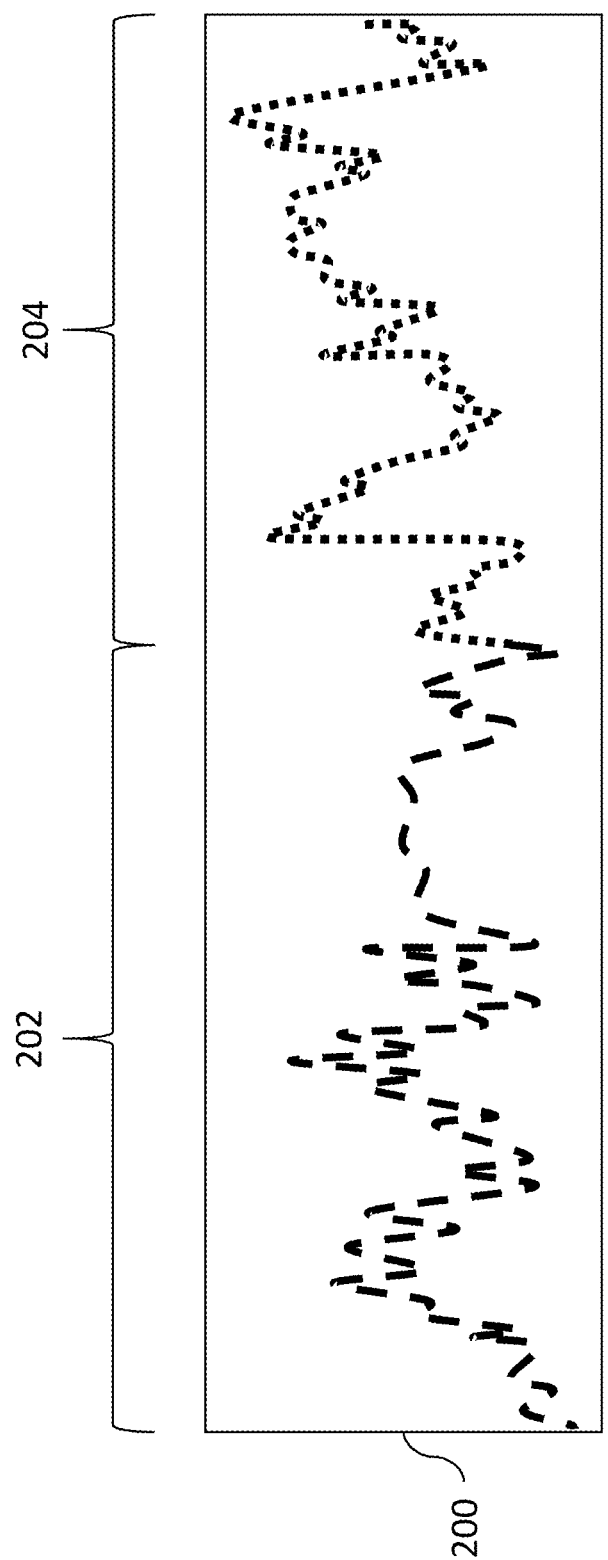
FIG. 2 shows an example dataset separated into two sub datasets.
Figure 3B:
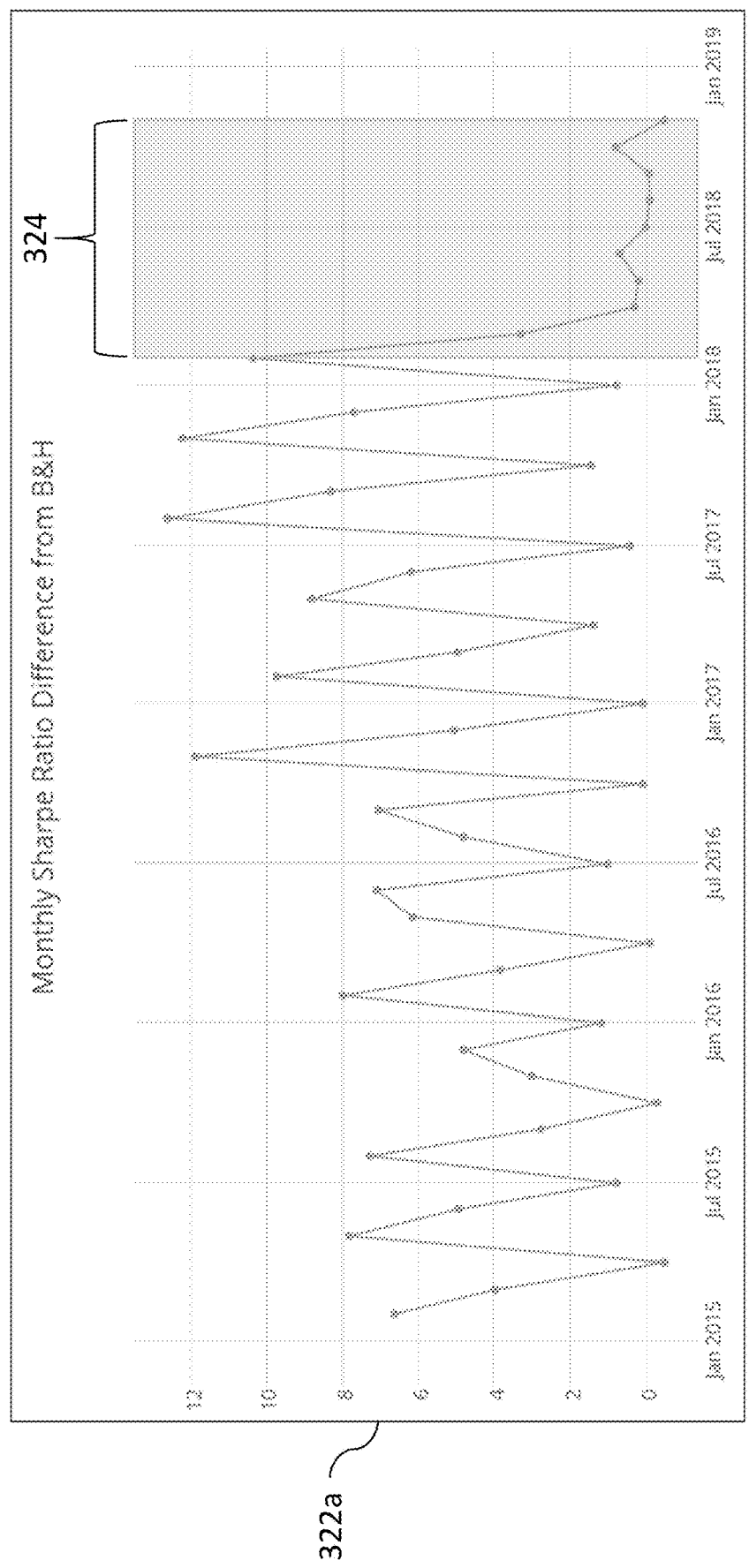
Figure 3C:
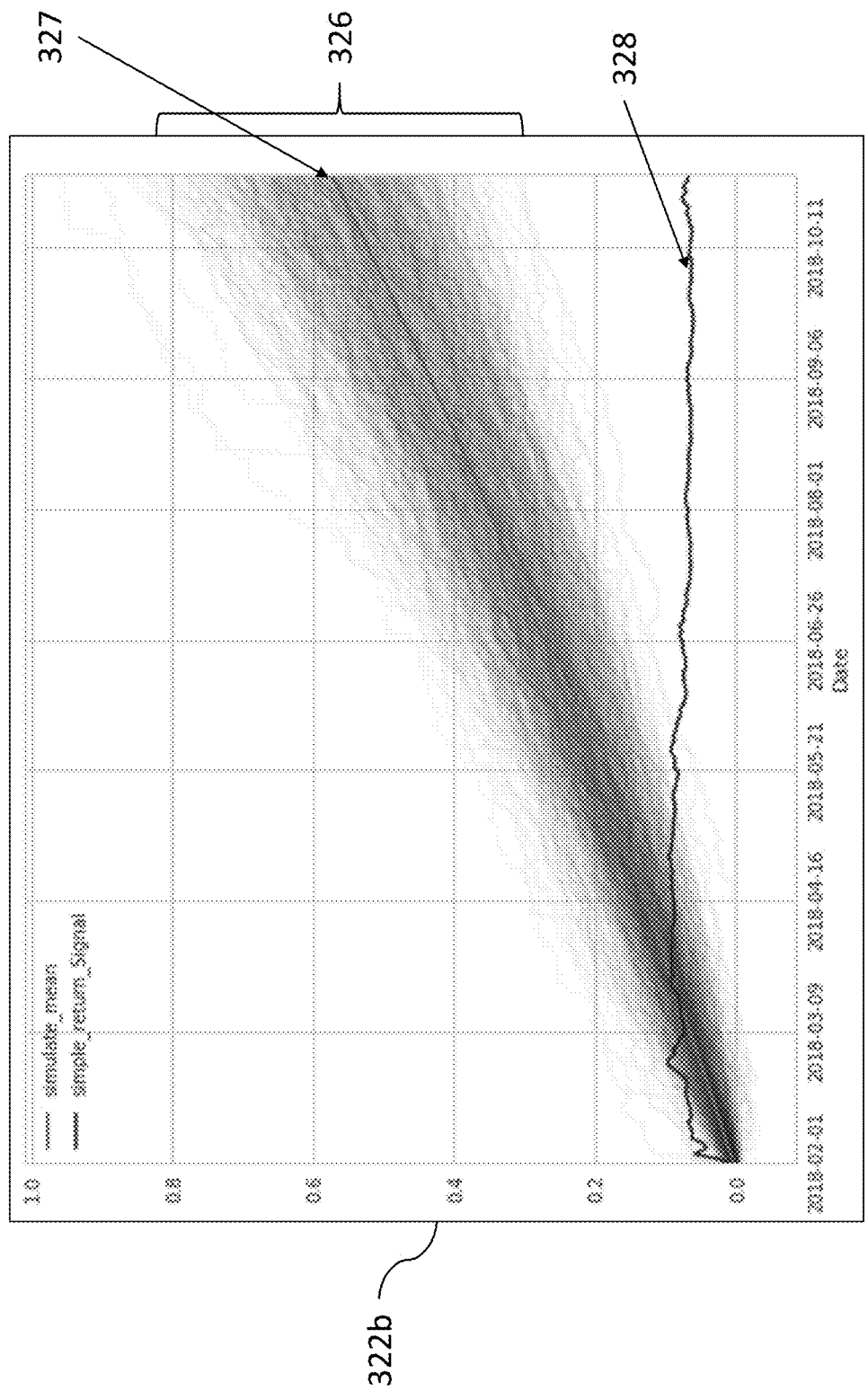
Figure 4A:
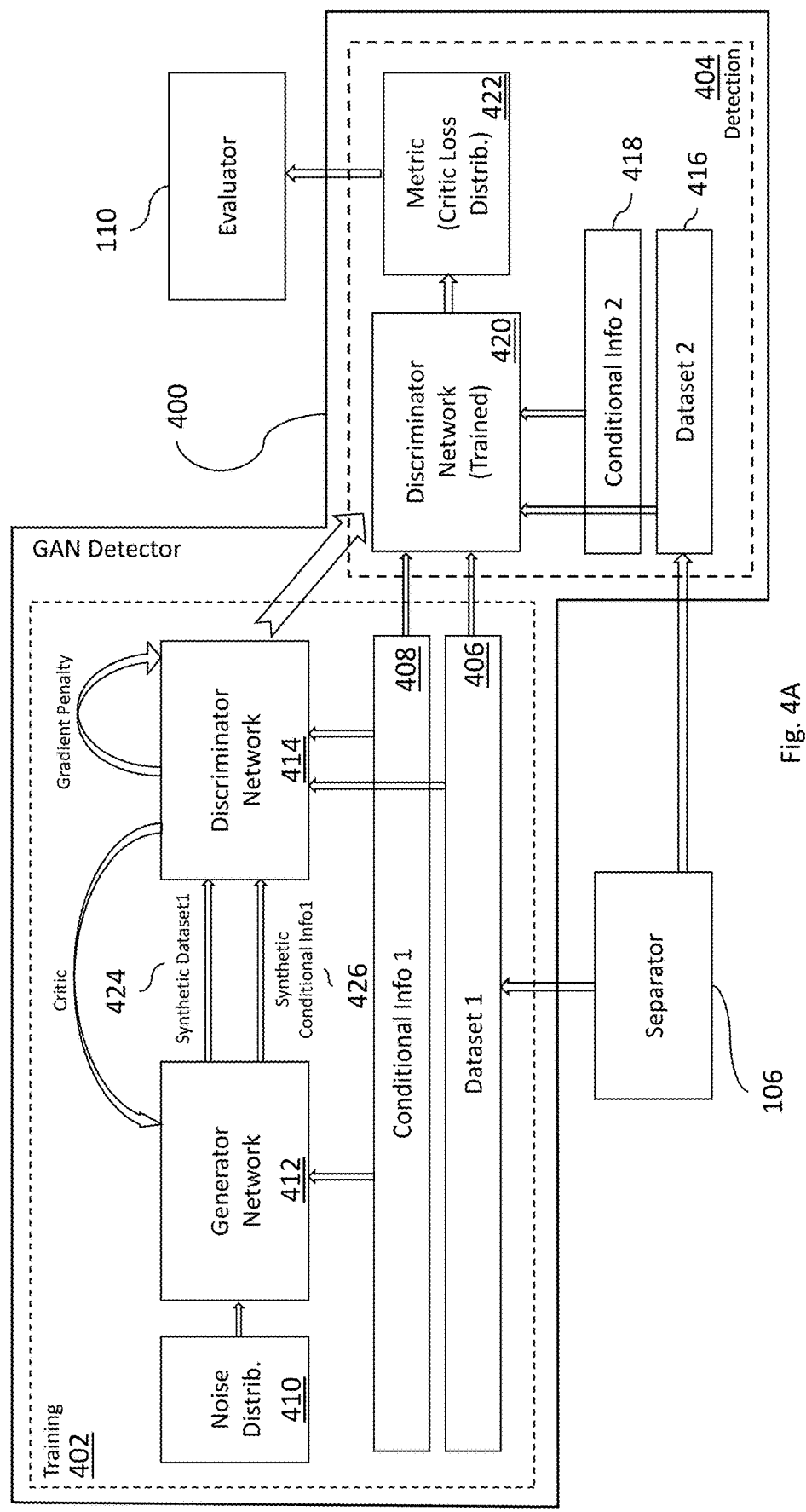
FIG. 4A is a block diagram of a GAN Detector that may be used in the system shown in FIG. 1 according to certain example embodiments.
Figure 4B:
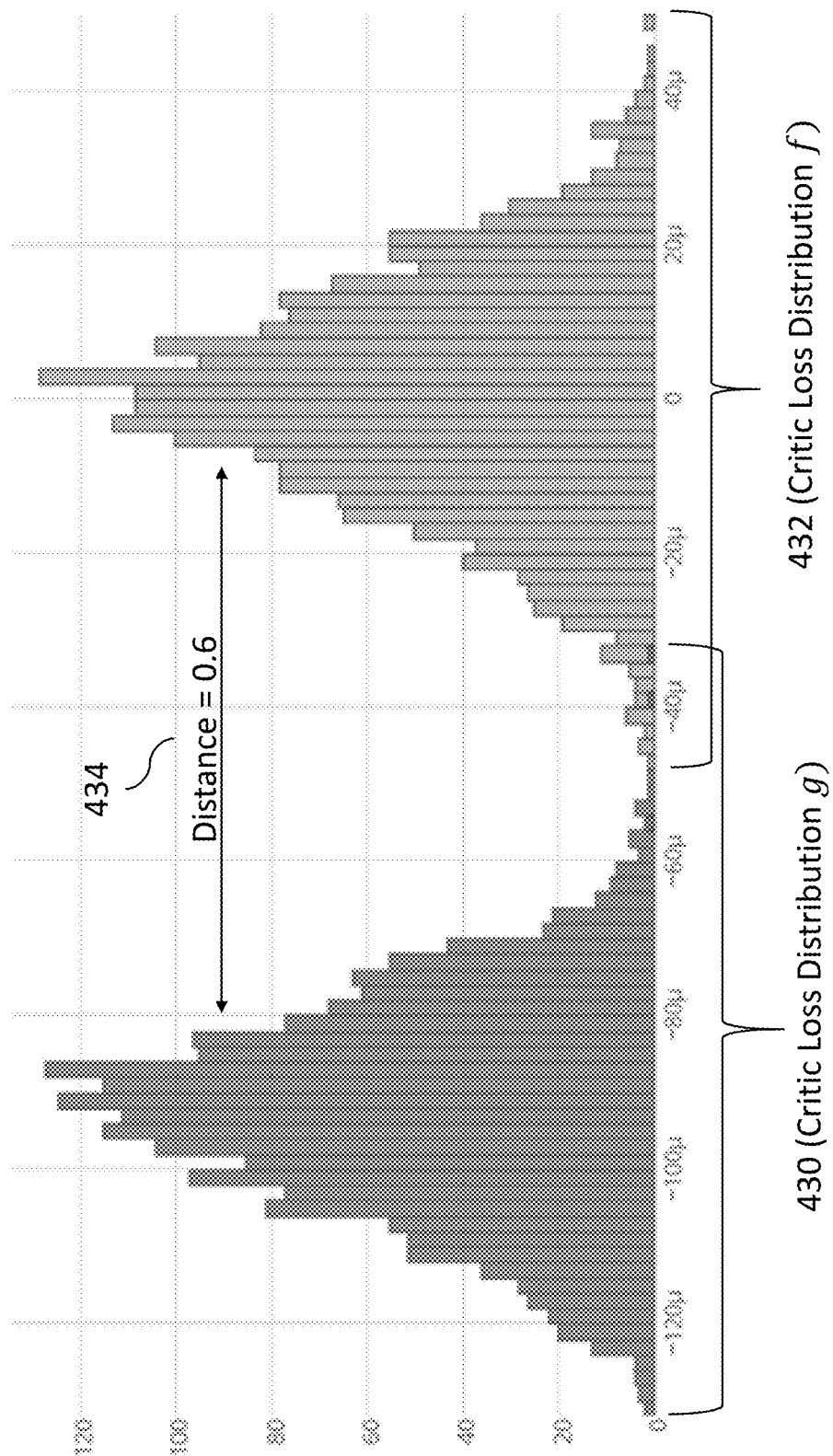
FIG. 4B is an illustrative example of the distance between two critical loss distributions.
Figure 5A:
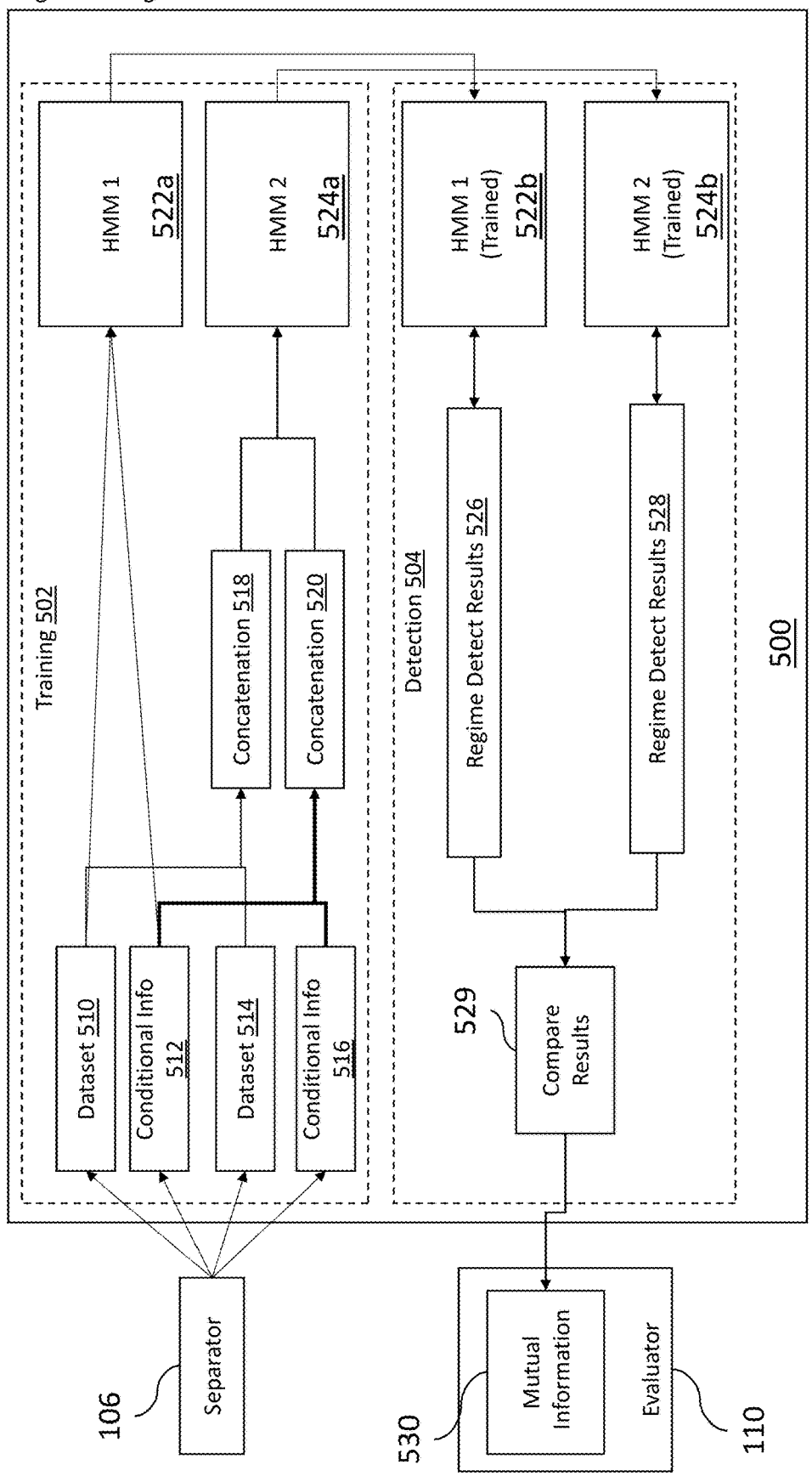
FIG. 5A is a block diagram of a structural change detector that may be used in the system shown in FIG. 1 according to certain example embodiments.
Figure 5B:
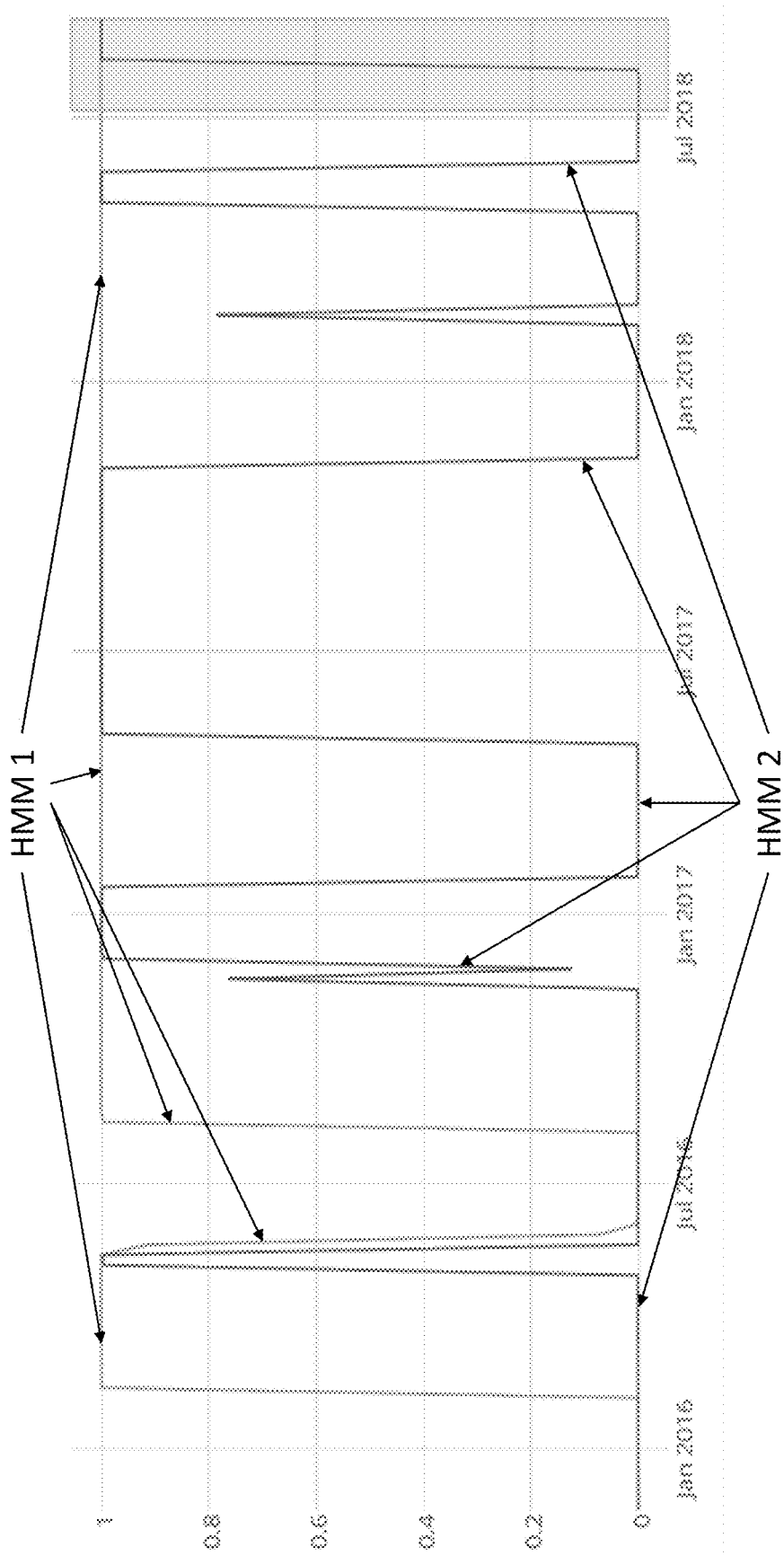
FIG. 5B is a graph that shows the different hidden state probabilities using different trained Hidden Markov Models according to certain example embodiments.
Figure 6:
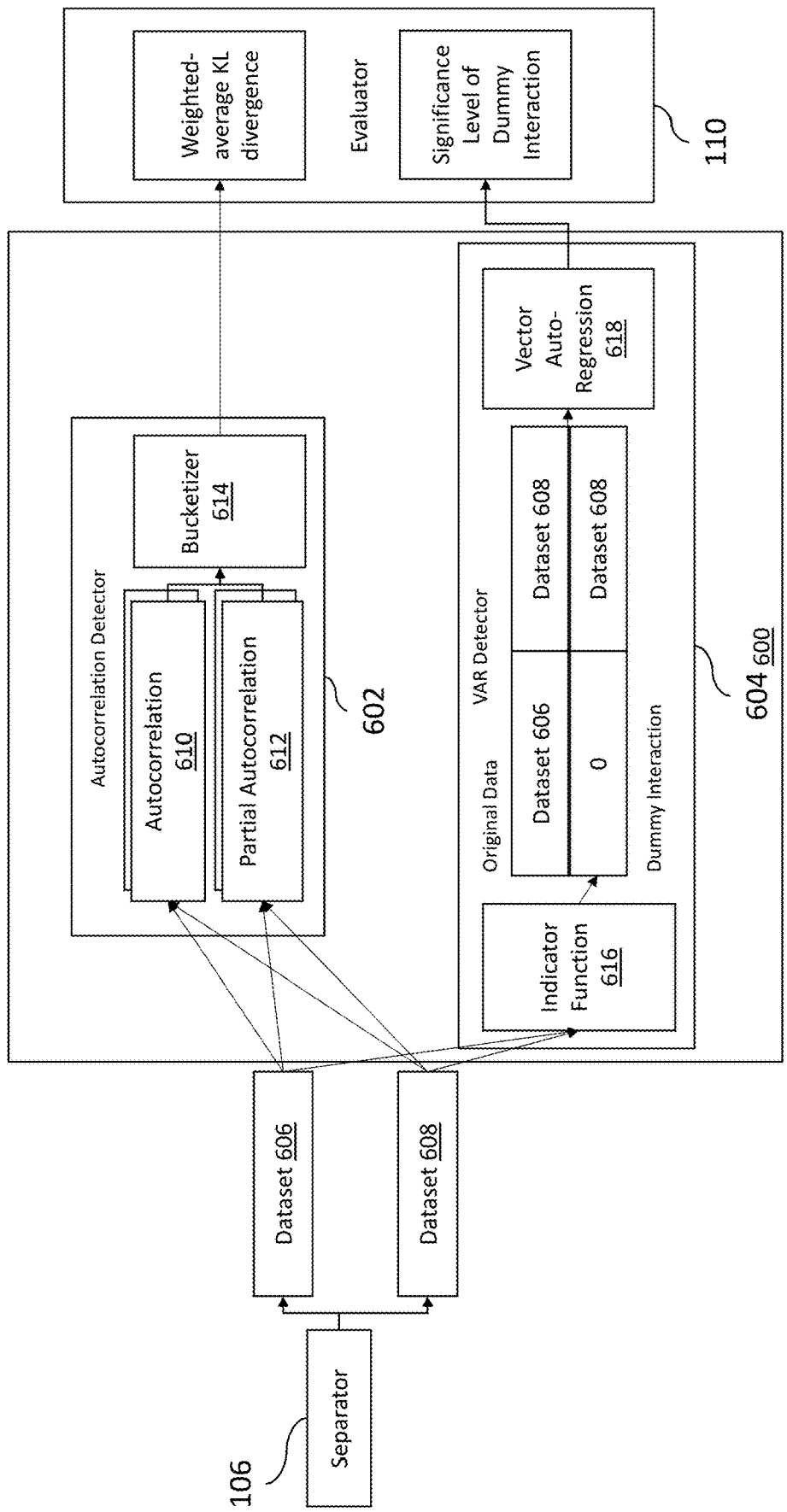
FIG. 6 is a block diagram of a time series detector that may be used in the system shown in FIG. 1 according to certain example embodiments.
Figure 7:
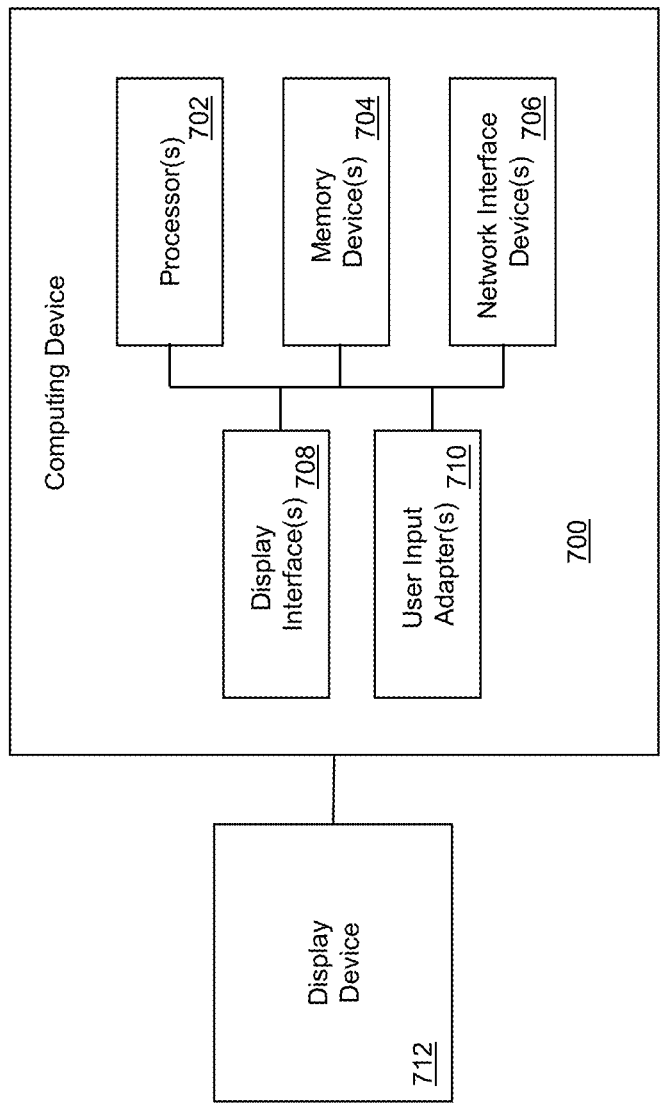
FIG. 7 shows an example computing device that may be used in some embodiments to implement features described herein.

FIG. 1 shows an example computer system for detecting changes in datasets, for example, the dataset shown in FIG. 2. FIGS. 3A-3C show additional examples of different types of datasets that may be analyzed using the system shown in FIG. 1. FIGS. 4A, 5A, and 6 are block diagrams illustrating different types of detectors that may be used in the system shown in FIG. 1. FIG. 4B graphically shows two critic loss distributions that may be calculated using the GAN detector of FIG. 4A. FIG. 5B graphically illustrates the two outputs from using the HMMs of FIG. 5A to assess two different datasets. FIG. 7 is an example computing device that may be used to implement one or more elements of FIG. 1 and each or all of the detectors shown in FIGS. 4A, 5A, and 6.

The system includes a separator module (also called a separator), one or more detector modules (also called detectors), and a evaluating module (also called an evaluator). The separator module splits datasets into subgroups (e.g., sub datasets) and then feeds the subgroups to the various detectors of the system. Each detector (there are usually multiple different types of detectors for a given system) then evaluates (e.g., separately) a level of difference between the paired subgroups that have been supplied to the respective detector and outputs one or more metrics that are based on the difference. Different types of detector modules may include, for example, a distribution shift detector, a structural change detector, a time series characteristics detector, a detector that uses generative adversarial networks (GAN) or a GAN detector, and others. The outputted metrics from the detectors are provided to the evaluator that may then generate, for example, a pass/fail determination (e.g., a binary decision) or a probabilistic determination that relates to the data source(s) that produced the datasets.

In many places in this document, software modules (e.g., separator module 106, detector modules 108a, 108b, and 108c, evaluator module 110, and the like) and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 7.

Description of FIGS. 1-3C

FIG. 1 shows an example system architecture for a data model detection system 100 (system) according to certain example embodiments. System 100 communicates with data sources 102 that provide datasets. System 100 includes a database 104, separator module 106, detector modules 108a, 108b, and 108c (and possibly more detector modules), and evaluator module 110. System 100 provides outputs from the evaluator module 110 to a monitoring or alert service 112.

System 100 may include or be provided on one or more of computing devices 700. In certain example embodiments, system 100 may be a distributed computer system that comprises multiple different computing devices 700 that communicate with one another over a computer network, electronic data network, or electronic data communication backplane. In certain example embodiments, system 100 may operate in a cloud-based computing environment where computing resources (e.g., processor(s) 702, memory devices 704, etc.) may be used according to the computing needs of system 100.

In certain example embodiments, each module or component (e.g., separator 106, detectors 108a, 108b, 108c, and evaluator 110) of system 100 may be hosted in its own virtual container or virtual machine that operates in conjunction with underlying computing resources (e.g., computing devices 700).

Each module or component may be viewed as a separate process (e.g., have separate processing logic) that operates concurrently, simultaneously, in parallel, sequentially on the system 100. In other words, each module or component includes separate processing (e.g., different techniques for analyzing a dataset) with one or more operations (e.g., one or more program instructions) that are used to manipulate and assess the datasets in question. The process for each module or component may be implemented in hardware or software. In certain example embodiments, the processing for each module or component may be implemented in the same computer process or separate computer processes (e.g., the in-memory instantiation of a given computer program). Each module or component may be executed within the same computer process (e.g., an instance of a computer program or a program logic structure). For example, each module or component may be incorporated into a single computer program for which an instance thereof is a single computer process. Each module or component may be executed within its own thread within that computer process. In certain example embodiments, each module or component may be executed within different computer processes. For example, each module or component may be implemented as a separate computer program (or the same computer program), with each instance thereof being a separate computer process that includes processing logic for the corresponding module or component. As noted above, the computer processes that execute the processing associated with each module or component may be virtualized and run within a container (e.g., docker) and/or on their own individual virtual machines. In certain example embodiments, different hardware elements (e.g., FPGAs, ASICs) may be used to implement the processing associated with each or any of the modules or components.

Datasets are provided to system 100 from data sources 102. Data sources 102 can be computing devices (e.g., 700) that are remotely located from system 100. In certain example embodiments, data sources 102 may be a database or the like that is accessed by system 100. Data sources 102 can include personal computers, mobile devices, automated computer systems (e.g., algorithms generate data), and the like. Data sources 102 can include any computer system (such as the computer system shown in FIG. 7) programmed to interface with system 100 for the purpose of submitting datasets that will be analyzed by system 100. In certain examples, the datasets that are supplied by data sources 102 may be datasets from publically available data feeds. For example, a company may post or make available data (e.g., in the form of a text file, a database file, a character delimited file, email, etc. . . . ) on a daily, weekly, monthly, or quarterly basis. System 100 may then use that data as a dataset (or part of a dataset) for processing. In certain examples, data sources 102 may provide datasets to system 100 by e-mail or other transfer protocols (e.g., sFTP, FTP, HTTP, etc.).

The type of data that data source(s) 102 provide to system 100 may vary based on application need. As noted herein, data sources may be external computer systems that include, for example, black box systems such that input data is received by the black box computer system and data is output and passed onto different client systems (one of which may be system 100). For example, one data source may be from a weather predication service that takes weather input data (e.g., various sensor readings) and outputs a weather prediction for 1, 3, and 5 days in the future. The processing of getting from the input data to the weather prediction may be closed to outside observers. The techniques discussed herein may provide a determination as to if the processing associated with, for example, a weather prediction service or system (or other type of service or system) has changed (e.g., over time). System 100 may allow for interfering or otherwise determining if changes have occurred in the external system without relying on knowledge of the processing that is performed by the external system. Rather, system 100 may make such determinations based on the data produced by such external systems.

Three non-limiting illustrative examples of different types of datasets are shown in FIGS. 3A-3C. Dataset 302 in FIG. 3A is a dataset of daily dice rolls from a process that produces dice rolls and a corresponding prediction for each daily roll (e.g., an example of a prediction may be whether to bring an umbrella to work based on the dice roll). This dataset may be processed by system 100 to determine if there has been a change in the die used for the rolls (e.g., perhaps the die physically changed due to a crack or the like).

Dataset 312 is a dataset of digitized sound that has been output from a speaker and used by a system (e.g., a black box system) to determine the quality of the speaker. This data may be supplied to system 100 to determine whether the quality of a speaker has deteriorated over time.

Datasets 322a and 322b show data for a system that provides a binary output on whether to buy or sell a given stock. Historical dataset 322a is from 2015 to early 2018. The historical data indicates good performance of this buy/sell indicator. However, the performance going forward (February 2018 onwards) did not align with that history. Passing the datasets 322a/322b through system 100 may reveal potential issues with the historical data. Such revelations may be used to identify potential issues with the black box processing used by the external system. In this particular example, the data model used by the black box processing of the data source was being trained using future data— something that is not possible from the present onwards. This explained the recent performance drop shown in the later part of data shown in dataset 322a.

Naturally, the above are just examples of the types of data that may be assessed using the techniques described herein.

Returning to FIG. 1, datasets that are received by system 100 may be stored to database 104. Database 104 may be a flat file, list, structured database (e.g., a relational database), or other data structure that is used to store various datasets that are received from one or more data sources 102. Database 104 is accessible by different components of system 100 including the separator module 106, detector modules 108a-108c, and evaluator module 110. The database 104 may also be accessed by the monitoring service (e.g., on an as needed basis). Separator module 106 is a software process or module that splits datasets received form the data sources into meaningful subgroups and pairs them together according to their data content. Different types of techniques may be used by the separator module 106 to split the dataset(s) including, for example, moving windows (e.g., over different time windows), sector classification, and/or grouping by symbols (a subgroup of a dataset is associated with a first symbol and another subgroup of that same dataset is associated with a second symbol). FIG. 2 illustrates how an example dataset 200 may be split by the separator module 106 into subgroups 202 and 204.

Other examples of how separator module 106 may split datasets are shown in FIG. 3A where dataset 302 is split between subgroups 302a and 302b. These particular subgroups may be determined by a rolling window or other similar technique for splitting the dataset. In certain examples, both subgroups of a given dataset may be determined using a rolling window. In certain examples, one of the subgroups may be fixed (e.g., the last 6 months of data over a 5 year period) and the other subgroup may change using a 6 month rolling window. In other examples, each of the subgroup may use a rolling window to select subgroups of data within a larger dataset. Thus, in certain examples, each overarching dataset (e.g., returns for the S&P 500 over the last 10 years) may be divided by only taking some of the subgroups/sub-datasets within that overarching dataset. The techniques discussed herein may then be applied to each of the paired subgroups of the dataset.

Dataset 312 in FIG. 3A includes two subgroups 312a and 312b that are separated by separator module 106. Each subgroup may be different test data (e.g., that is from different test periods) from a sound test that is periodically run for a speaker.

FIGS. 3B and 3C show data generated from example performance detectors. The detectors where feed an input dataset that included trading signals in time series (+1/0/−1) indicating long/clear/short positions that one should take on the next trading day. This dataset was split into first and second datasets based on a time when the data was first received onwards. In other words, data in the first dataset was already generated when supplied, while data in the second dataset was "current".

The first and second datasets are passed to performance detectors that then output additional generated datasets as shown in FIGS. 3B and 3C. The output data may then be passed to evaluator module 110 for further processing. FIG. 3B shows a trading performance metric (e.g., a Sharpe ratio) and the shaded area (324) is the on-going performance that is generated based on a second dataset of a dataset pair that is submitted to the performance detector. Area 324 shows that there is a decay in performance being detected.

FIG. 3C is a visualization of MCMC (Markov chain Monte Carlo) using stock returns generated based on a first dataset of the dataset pair. The lines from 326 in graph 322b are the expected cumulative returns trajectories that are supposed to occur using the second dataset based on the performance from the first dataset. Line 327 is the simulated mean of the lines 326. Line 328 is the actual performance that results from the second dataset.

Returning to FIG. 1, once the data is separated by the separator module 106, the paired subgroups (which are also datasets themselves) are passed to one or more (usually multiple) different detector modules 108a-108c. Note that while three detector modules are shown in FIG. 1, any number of detector modules may be used. For example, 5 or 10 detector modules may be used by the system 100 when datasets are analyzed.

The detector module(s) may be programmed to determine (or provide metrics that are used to determine) how different/similar the two subgroups of data within a given dataset are. Each different type of detector may be used to glean or determine different aspects of how the subgroups are different (or not different) from one another. Each of the detector modules may be a separate computer process (e.g., a software application) that takes the provided datasets as input (e.g., from the separator module 102) and outputs results of the processing performed by the detector.

Using dataset 302 as an example, each different detector may use different types of processing to arrive at a determination or calculation that represents a level of difference between the two subgroups (e.g., 302a & 302b in this case) within the dataset. Different types of detectors may be used depending on the particular data types for the data being analyzed. Detector modules 108a-108c may include one or more of the following detector types.

A coverage detector that focuses on entity coverage of the data (e.g. ticker symbols) within the dataset to detect whether there is any significant turnover.

A distribution shift detector may provide surveillance on the overall distribution similarity and detect distribution shape changes/shift (if any). This may include mean difference, standard deviation difference, central score distribution, tail score distribution, and the like.

A time series detector (e.g., as discussed in connection with FIG. 6) may monitor the data evolvement over time and compare the difference between different time series characteristics. In certain examples, a time series detector may include an autocorrelation detector and a VAR detector.

A structural change detector (e.g., as discussed in connection with FIG. 5) may be used to detect different hidden states (e.g., regimes) behind the data and search for pattern changes (e.g., that are structurally significant) in the data.

A GAN detector may apply unsupervised machine learning techniques (e.g., using generative adversarial network (GAN) techniques) and a discriminator to detect differences (e.g., which may be trivial) between datasets and groups therein along with conditional information.

A performance detector may measure dataset/signal consistency by creating an investment strategy (or other strategy), while performing historical & on-going back tests with performance measurements.

Other types of detectors may also be used according to certain example embodiments.

The outputs from the detectors (e.g., the measured difference between the subgroups processed by each detector module 108a-108c) may be stored back to database 104. Such information may also be communicated or made available to the evaluator module 110.

The evaluator module 110 takes the outputs from the detector modules 108 and processes them to generate an output. The output may be, for example, a pass/fail determination that is passed to monitoring service 112. The pass/fail determination may represent a determination that the data source has, in some way, been altered such that the data being output from it is, for example, unreliable. In certain example embodiments, a fail determination may represent a determination that the dataset is anomalous. The determination by the evaluator module may be stored back to database 104 for future processing. In certain example embodiments, the output may be a probabilistic determination.

In certain example embodiments, the determination from the evaluator module 110 may be used for calculating additional statistics, performing hypothesis tests, and/or setting or controlling additional thresholds. In certain example embodiments, the various outputs from the detectors are then used by the evaluator to make an overall determination as to whether there is a significant, meaningful, or other change that occurred between the two datasets. In certain example embodiments, the evaluator module 110 may take the results from each of the plural detectors 108 and make a determination as to whether the analyzed datasets are consistent or there is a significant or anomalous change with respect to one another. In certain example embodiments, the evaluator module 110 may make a determination that there is a meaningful change in the dataset only if the individual evaluations performed with respect to each detector indicates an issue. In certain example embodiments, such a determination may be made if the output from one detector indicates an issue, but another does not. For example, if the results of detectors A and B are within their respective thresholds, but the results of detector C are outside of its corresponding threshold, then the evaluator module may determine that the underlying datasets may be anomalous and may pass such a determination to the monitoring service 112. Thus, the determination of whether datasets A and B are anomalous with respect to one another may be based on the collective and/or individual testing of the output from the respective detectors against their respective thresholds.

In certain examples, the evaluator module 110 may weigh the outputs from each detector based on the type of data that is being analyzed. For example, the time series detector 600 may be weighed more heavily when time series data is being analyzed. In other examples, the evaluator module 110f may only mark or otherwise flag a dataset as problematic if each detector indicates an issue.

Additional processing may be handled by the monitoring service module 112. In certain example embodiments, the monitoring service module 112 may be programmed to issue alerts (e.g., via e-mail, text, etc. . . . ) when a dataset is determined to be anomalous or otherwise includes changes that are statistically meaningful or significant.

In certain example embodiments, the evaluator 110 (or each detector) may provide a determination as to whether the changes (if any) between the two datasets are statistically significant. As used herein, statistically significant means that a result (which may be a distance as discussed herein) is not due to chance. In other words, the difference between the two datasets is determined to be not attributable to chance.

In certain example embodiments, statistically significant may be determined through calculation and use of a p-value and corresponding threshold. The p-value indicates the probability of obtaining results at least as extreme as the results actually observed during the evaluation (e.g., assuming that the null hypothesis is correct). The null hypothesis is rejected if the p-value is less than (or equal to) a predetermined threshold value (sometimes called a significance level and is the probability of rejecting the null hypothesis given that it is true). Different predetermined threshold values for assessing a calculated p-value may be used. For example, if a threshold of 5% (0.05) may be used, then the changes between the two analyzed datasets may be labeled as statistically significant if the calculated p-value is lower than this threshold. Different P-value thresholds (e.g., 0.005, 0.01, 0.02, 0.03, 0.04, etc.) may be used depending on the nature of the problem and the type of data being analyzed. Other techniques for assessing statistical significance besides p-values may also be used.

Description of FIGS. 4A-4B

FIG. 4A is a block diagram of a GAN Detector 400 according to certain example embodiments.

A generative adversarial network (GAN) training strategy sets up a game between two competing (e.g., neural) networks. A first network (a generator network) combines a source of noise to/with an input dataset (e.g., an input space) to produce a synthetic dataset. A second network (a discriminator network) then receives true data and the output from the generator and distinguishes between the two. Further discussion of GANs may be found in *Improved Training of Wasserstein GANs* from Gulrajani et al, December 2017, the entire contents being hereby incorporated by reference.

GAN detector 400 in FIG. 4A includes a training module 402 and a detection module 404. Training module 402 a detection module 404 are software processes, but may also be implemented in hardware (e.g., FPGAs, ASICs, etc.) As previously mentioned, separator module 106 may be designed to split a dataset into two different subgroups or sub-datasets. These subgroups are represented in FIG. 4 as dataset 1 (406) and dataset 2 (416). So in FIG. 4A, the separator 106 passes dataset 406 to the training module 402 and dataset 416 to the detection module 404 for processing.

In certain example embodiments, the networks discussed herein (e.g., generator network 412, discriminator network 414/420, etc. . . . ) may be neural networks. Neural networks may group input data sets according to similarities among the input data sets by learning to approximate an unknown function between any input and any output. In the process of learning, the neural network may find a function that transforms the input into the output. Neural networks include processing nodes and each processing node in a layer of nodes in the neural network combines input data sets with a set of coefficients, or weights, that either increase or decrease that input, thereby assigning significance to input data sets for the target metric the neural network is trying to learn. These input-weight products or weighted input datasets may then be, for example, summed, and the sum is passed through a processing node's activation function to determine whether, and/or to what extent, that sum signal progresses further through the network to affect the ultimate neural network output.

When training the neural network, each node layer learns automatically by repeatedly trying to produce or reconstruct a target metric. Each training iteration produces an error measurement or "loss" (e.g., the critic loss that is passed back to the generator network 412) between the weighted input and the target metric, and the error is used to adjust the weights to the extent they contributed to the error. A collection of weights, whether at the start or end state of training, is also called a model. A neural network can be viewed as a corrective feedback loop, rewarding (increasing) weights that reduce error and punishing (decreasing) weights that increase error.

Each processing node within the network may be viewed as a switch that turns on and off depending on whether or not it should let the input pass through to affect the ultimate decisions of the network. A non-linear function translates input to shape the node output. The nonlinear function at each node may be an s-shaped function similar to a logistic regression. The outputs of all nodes, each having been translated into a space between 0 and 1, are then passed as input to the next layer in a feed forward neural network, and so on until the signal reaches the final layer of the network, where decisions are made.

An optimization function called "gradient descent" (call gradient penalty in FIG. 4) can be used to adjust weights according to the error they caused until the error cannot be reduced any more or reaches a threshold value. The neural network converges when it has reached that threshold error, and at that convergence point, the neural network is "trained" (e.g., thus producing discriminator network 420 or other "trained" networks).

Returning to FIG. 4A, separator module 106 supplies dataset 406 and conditional data 408 to training module 402. In certain example embodiments, these datasets are combined and input into the discriminator network 414. Conditional data 408 (and other conditional information/data discussed herein) may be used to represent additional information that is not necessarily present in datasets 406 and 416. For example, if the datasets include data on electricity consumption, then conditional information may include the temperature of the day for the electricity consumption (e.g., electricity consumption tends to be higher when it is very hot or very cold).

Generator network 412 also receives conditional data 408 and noise 410 to produce synthetic dataset 424 and synthetic conditional data 426. Both synthetic dataset 424 and synthetic conditional data 426 are passed to the discriminator network 414.

Discriminator network 414 then will try to determine whether the data being received from the generator network 412 and/or the data being received from the separator is synthetic or "real." In certain example embodiments, a gradient penalty is used to help train up the discriminator network 414.

Based on the results of discriminating over the synthetic dataset 424 and/or dataset 406, the discriminator network 414 will feedback critic data (e.g., critical loss) to the generator network 412. This data is used to inform the generator network 412 on the quality of the generated synthetic data. Such data may include how close the synthetic data is to the real data and which "direction" the generator network 412 should go for future synthetic datasets (e.g., such information may assist in training the generator network 412).

Once the discriminator network 414 has been trained (e.g., it has converged), then the detector 400 moves to the detection module 404 where the trained version (420) of the discriminator network is used to determine if there are differences between dataset 406 and dataset 416 (the two subgroups of an original dataset) using conditional information 408 and 418. The level of difference between datasets 406 and 416 is metric 422 (e.g., the distance between the difference distributions) that is then passed to evaluator 110 for further processing. In other words, the discriminator network 414 may be used to create a metric that measures the critical loss distribution between the two subgroups of the dataset that is supplied to the GAN detector. This may be represented by the following equation:

$$L = \mathop{\mathbb{E}}_{\tilde{x} \sim P_g} [D(\tilde{x})] - \mathop{\mathbb{E}}_{x \sim P_r} [D(x)] + \lambda \mathop{\mathbb{E}}_{\hat{x} \sim P_{\hat{x}}} [(\|\nabla_{\hat{x}} D(\hat{x})\|_2 - 1)^2]$$

$$\text{With } \lambda \mathop{\mathbb{E}}_{\hat{x} \sim P_{\hat{x}}} [(\|\nabla_{\hat{x}} D(\hat{x})\|_2 - 1)^2]$$

being the gradient penalty and $$\mathop{\mathbb{E}}_{\tilde{x} \sim P_g} [D(\tilde{x})] - \mathop{\mathbb{E}}_{x \sim P_r} [D(x)]$$

being the original critic loss. Where $\mathbb{E}$ is the Expectation, D is the discriminator network, x is real data example $x \sim P_{real}$, and $\tilde{x}$ is generated data example $\tilde{x} \sim P_{generate}$.

In certain example embodiments, once the discriminator network is trained (420) (e.g., it has converged), then a benchmark critic loss distribution may generated. The benchmark critic loss distribution may be determined by passing two datasets (e.g., $x_1$ and $x_2$, which may be subsets within dataset 406) and any corresponding conditional information to the trained discriminator network 420 to calculate the critic loss for each dataset. In general, the two datasets passed into the trained discriminator network 420 may be sample data from the same overarching dataset. For example, if the datasets are for the average daily temperature change from various cities, then two sample datasets from the same city would be used to determine a benchmark critic loss distribution f which may be represented as:

$$f \sim \mathbb{E}_{[D(x_1)]} - \mathbb{E}_{[S(x_2)]}$$

An expected distribution spread for f should be around zero (e.g., if the discriminator network has been well trained and $x_1$ and $x_2$ are from the same dataset). Conversely, a distribution spread that is not zero may indicate that $x_1$ and $x_2$ are not from the same dataset. If the distribution spread is not around zero it may indicate a problem with the model that has been trained and/or the underlying data that is divided into $x_1$ and $x_2$.

With the benchmark critic loss distribution determined, a second critic loss distribution between, for example, $x_1$ (e.g., part of or dataset 406) and $x_3$ (e.g., a dataset from another city or dataset 416) may be calculated. This may be represented by:

$$g \sim \mathbb{E}_{[D(x_3)]} - \mathbb{E}_{[D(x_1)]}$$

In other words, dataset $x_3$ is the dataset that the GAN detector is being used to determine if there are anomalies between dataset 406 and dataset 416. generated critic loss distributions f (432) and g (430) are shown in FIG. 4B. Once these are generated, then the distance 434 (e.g., 0.6) between those two critic loss distributions may be calculated. The graph in FIG. 4B shows that the reference critic loss distribution varies a noticeable amount from the calculated critic loss distribution that is based on dataset 416.

In certain example embodiments, the distance may be calculated as the standardized Kullback-Leibler (KL) divergence. This will usually be a number between 0 and 1, with numbers closer to 1 representing a larger distance between the two distributions. The distance value may be passed to the evaluator module 110 that may then compare the calculated distance value to a preset threshold. An example threshold value may be 0.1. If the calculated distance value is greater than the threshold, then $x_1$ and $x_3$ would be determined to not be from the same overall dataset or may indicate an anomalous condition between the two datasets.

GAN Detector 400 may be used to detect changes or differences in a data stream (e.g., a dataset over a period of time) that may, in certain instances, be subtle. For example, a GAN detector may be used to detect gradual decays in data being reported by a data source. As a specific example, consider a temperature sensor that reports temperature readings every hour over many years. These readings will vary based on the time of day, the current weather, the time of year, etc. . . . . However, in this case and unbeknownst to the receiver of the data, the accuracy of the reported temperature readings from the sensor may slowly decay (e.g., perhaps being off by about a degree or so). A GAN detector as described herein may be used to detect when such abnormalities are present in the reported data. The GAN detector 400 may thus be able to differentiate between changes that are not abnormal changes (e.g., the sensor is still working correctly) and those are abnormal changes. Such changes may be gradual (e.g., that occur over a long period of time, like weeks, months, or years) and/or subtle (e.g., 1 or 2 percent) in nature.

The GAN detector 400 also operates in an unsupervised setting and is able to process the provided dataset(s) without relying on labels, such as knowing beforehand which dataset is "correct."

Description of FIGS. 5A-5B

FIG. 5A is a block diagram of a structural change detector 500 according to certain example embodiments. The structural change detector 500, which may also be referred to as a "regime change detector," may be used to detect structural changes in data (e.g., the data supplied by a given data source 102) by using two differently trained Hidden Markov Models (HMM). Structural change detector 500 includes two sub-components, a training module 502 that trains one or more models and the detection module 504 that will then use those trained modules to calculate a metric that is output to evaluator module 110.

As noted above, the structural change detector 500 may be used to detect structural changes in the data being supplied from a data source 102. For example, consider a temperature sensor that is on the north side of a building and thus always (or nearly so) in shade. The readings from that sensor may be collected by a data source 102 (or the sensor may be a data source). At some point the building may be torn down and the sensor may now be always in direct sun light. While the sensor has not changed (e.g., it is still functioning properly, it hasn't been moved, etc. . . . ), there will now be a structural change in the data being reported by the sensor. The structural change detector 500 described herein may allow for detection of such structural changes in the data being supplied from data source(s) 102.

Data for the structural change detector 500 is supplied from separator 106. Separator 106 provides datasets 510 and 514 (e.g., subgroups) and also supplies conditional information 512 and 516 for each of those respective subgroups to the training module 502.

Dataset 510 and its corresponding conditional information 512 are provided as inputs to a first HMM 522a, which is then trained to produce trained HMM 522b.

Dataset 510 and dataset 514 are concatenated to form concatenated dataset 518 while conditional information 512 and 516 are concatenated to form concatenated dataset 520. The resulting concatenated datasets are passed as input to HMM 524a and that HMM is then trained to produce HMM 524b. Other techniques for combining dataset 510 and 514 may also be used, such as, for example, appending dataset 514 to dataset 510. Indeed, whenever it is mentioned herein that datasets or data may be concatenated, such data or datasets may instead be appended to one another or otherwise combined.

Detection then occurs at 526 and 528 for each (trained) model and those results (e.g., Prob1 and Prob2 discussed below) are compared at 529. The results of the comparison (e.g., mutual information 530) are passed to the evaluator module 110.

Specifically, once HMM 522 and 524 are trained, then dataset 514 and conditional information 516 are provided as input to both HMM 522b and 524b ( ). In other words, while HMM 522a is trained with dataset 510 and HMM 524a is trained with concatenation dataset 518, both of the trained HMMs (522b and 524b) are then supplied with dataset 514 (and corresponding conditional information) to generate results 526 and 528. The two trained models (522b and 524b) may then be used to try an infer hidden states (e.g., state 0/1) separately from dataset 514 and output hidden state probabilities as Prob1 and Prob2. The different results may then be compared to determine whether there are significant, meaningful, and/or abnormal statistical changes within dataset 514 as compared to dataset 510. This is graphically shown in FIG. 5B, where the inferred probabilities from HMM 1 and HMM 2 are indicated and may then be compared to one another. The example in FIG. 5B shows that there is a significant, meaningful, and/or abnormal statistical change between the two datasets. In certain example embodiments, concatenation dataset 518 and conditional information concatenation 520 are supplied to the two trained HMMs to produce the results that are then compared.

Accordingly, for example, if the data in dataset 514 belongs to different regime(s) unseen in dataset 510, it will affect the transitional probabilities of HMM (e.g., HMM 524b) during training, leading to different predications and inferences.

Mutual information 530 between two inferred hidden state probabilities (Prob1 and Prob2) is calculated as a difference measurement. The mutual information 530 may be a number between 0 and 1 that measures the similarity between two datasets, with a higher number (e.g., closer to 1) being more similar. This mutual information 530 may then be passed to the evaluator module 110 that may then apply a preset threshold to determine if the mutual information is less than a threshold (e.g., 0.5). If it is less than the threshold then the data is determined to not be from the same dataset. For example, if dataset 510 includes daily temperature changes for Boston, Mass. and dataset 514 includes the daily temperature changes for Portland, Oreg., then the mutual information value may be less than 0.5 and represent a determination by the evaluator that dataset 510 and 514 are not for the same City (e.g., not from the same overarching dataset and that there has been a change in a "regime" between the two datasets). Other examples are also possible (e.g., determining that the daily returns stocks are not for the same ticker—as discussed in connection with the below example embodiment).

Description of FIG. 6

FIG. 6 is a block diagram of a time series detector 600 according to certain example embodiments. The time series detector 600 may allow for monitoring the evolvement of data over time (e.g., time series data) and for comparing differences between various time series characteristics in the data. The time series detector 600 may be set up to focus on trends or periodical patterns in data that occur across the time dimension.

Time series detector 600 includes two different detector modules. An autocorrelation detector module 602 and a vector autoregression (VAR) detector module 604. Each of these modules receives dataset 606 and dataset 608 (e.g., as output from the separate module 106) and performs processing for those modules. The results from the modules are then passed to the evaluator module 110. If the results pass a predefined criteria (e.g., one or more thresholds), then the evaluator will indicate that the datasets are similar (e.g., there is no apparent abnormality). The two separate detector modules within the time series detector may be used in parallel to assess datasets (e.g., time series datasets) for abnormal, significant, and/or meaningful changes. The combination of the two different detectors may provide different "views" on the same dataset and thus provide an increased (e.g., more complete or better) understanding of whether abnormal, significant, and/or meaningful changes have occurred within the dataset than would otherwise be available with just one of the detectors.

In the case of the autocorrelation detector module 602, this module includes processing for performing an autocorrelation function 610 and partial autocorrelation function 612 on the respective datasets. The partial autocorrelation function 612 may result in the partial correlation of a time series with its own lagged values while regressing the values of the time series to the shorter lags. Autocorrelation function 610 may result in correlation of a given time series—e.g., a similarity between points in the series as a function of the time lag between the points.

In certain example embodiments, multiple calculations may be performed using different lags (e.g., 1-10 as shown in Table 1 below) for each of 610 and 612. The output from the autocorrelation function 610 may be a continuous variable from −1 to 1. This output is then used as input for Bucketizer 614. Bucketizer 614 may be used to categorize or classify the results of the partial and full autocorrelation functions.

Bucketizer 614 is used to transform the continuous distribution from the autocorrelation function 610 to an ordinal and/or categorical distribution. This may help to capture general characteristics of a distribution while avoiding possibility unnecessary details or noise in the distribution. In certain example embodiments, the bucketizer may use preset bucket ranges. The below discussed example includes three buckets of: first bucket) [−1, −⅓], second bucket) [−⅓, ⅓], and third bucket) [⅓, 1]. Thus, if an input value falls into the first bucket (−1 to −⅓), then that will be marked as −1. Similarly, if an input value falls into −⅓ to ⅓ then it will be marked as 0 and if an input value falls into the third bucket it will be marked as 1. The values of −1/0/1 may provide data about the general characteristics of the autocorrelation distribution with −1 indicating a strong negative correlation, 0 indicating not so correlated, and 1 indicating a strong positive correlation. It will be appreciated that the above is by way of example and that other example bucketized threshold may be used (e.g., −1 to −0.5, etc. . . . ). In certain examples, 2, 4 or more different buckets may be employed.

Each lag that is calculated for the partial and full autocorrelations may be compared separately and the difference measurement may be determined as a weighted average of KL divergence. In certain example embodiments, this may be weighted by the scale of the partial autocorrelation (e.g., 0.8). The weighted KL divergence may then be passed to evaluator 110 for a decision. For example, KL divergence of 0.8 may correspond to a p-value of 0.001, which is less than 0.05 and therefore may be determined to represent a significant difference between the two datasets.

For the VAR detector 604, datasets 1 and 2 are passed to indicator function 616. Indicator function 616 may be a function defined on X that indicates membership of an element in a subset A of X, having the value 1 for all elements of A and the value 0 for all elements of X not in A. In this example, dataset 608 corresponds to subset A and the output of the indicator function is a dummy variable (e.g., 0/1). The indicator function may be used to assist the VAR model distinguish dataset 606 from 608 in the later process (e.g., because the datasets will be concatenated before being passed into the model). In certain example embodiments, the dummy variable that comes from indicator function 616 is also used to create dummy interaction variable.

Datasets 606 and 608 are concatenated and dataset 608 is concatenated with dummy variable data (which may be based on the original data and a dummy variable). An example of the concatenation of 606 and 608 is the returns column from Table 2 below. An example of the concatenation of dataset 608 with dummy variable data is the interaction column from Table 2 below. The creation of the dummy variable data may better "highlight" dataset 608. This may allow, for example, a VAR model to distinguish dataset 606 from 608 and detect whether there is any time series pattern differences between the two datasets. Both concatenated datasets are then passed to vector-auto regression module 618, which outputs to the evaluator 110 the significance level of the dummy interaction. Specifically, VAR module 618 performs a regression based on the inputted datasets to generate coefficients. For example, the VAR can be expressed as:

$$\gamma_t = \beta_0 + \beta_1 \gamma_{t-1} + \beta_2 \gamma_{t-1, interaction} + \epsilon_t$$

Where $\gamma_t$ is the concatenation of 606 and 608 and the regression that is performed will try to estimate coefficients $\beta_0$, $\beta_1$, and $\beta_2$ that best fit the data (e.g., from the interaction column in table 2). These coefficients are part of the output from the performed regression where $\beta_2$ represents the coefficients in front of the interaction. In certain example embodiments, results with coefficients that do not significantly differ from zero may correspond to a determination that there is no significant change in the time series pattern in the dataset.

In certain example embodiments, the p-value of the coefficients may be generated and then passed to the evaluator module 100 for a final decision. For example, if the p-value smaller than a predefined threshold (e.g., 0.01 or 0.05), then the evaluator module 110 may determine that the coefficient associated with the p-value is significantly different from zero. This may indicate abnormalities in the datasets. For example, that the two datasets are not for the same symbol.

As an example of how the time series detector 600 may be used consider a temperature sensor (or a service that uses a temperature sensor) that provides the average monthly temperature. The data that is provided may correspond to the various seasons (winter, summer, etc. . . . ) and data from the same month over multiple years may be correlated. However, as time goes by the sensor (or the service that is collecting the sensor data and providing the average) may start to break down by providing inaccurate data during winter months or when there is extreme cold. The techniques discussed in connection with the time series detector 600 may be used to detect such changes. Such detections may be made possible (e.g., even if the readings are still within a "normal" range of temperature readings) by checking the time series characteristics of the data. For example, by checking the distribution of autocorrelation.

It will be appreciated that other detectors (e.g., GAN detector 400) may be capable of detecting the above discrepancies in the time series data being provided. However, the time series detector may be more efficient in detecting such discrepancies than other types of detectors (e.g., GAN detector 400). This may be because the time series detector 600 can detect such issues by looking at the sequential relationship of the time series data. While, for example, GAN detector 400 detects such issues in an implicit manner. Time series detector 600 may also have better interpretability and less computing and/or training time that other detectors (e.g., GAN detector 400).

In certain examples, a time series detector may be able to detect issues that infrequently may occur over a long time period (e.g., a sensor is defective only when the temperature is really cold).

Example Implementation

The following is an explanation of an example implementation using the techniques discussed herein. The input data used in connection with this example is the daily returns for two stocks, "A" and "B," along with the daily returns for the S&P500. The daily returns of the S&P500 may be an example of conditional data/information that is used in connection with one or more of the detectors.

Datasets for the daily returns of A and B are called dataset A and dataset B. Datasets with the conditional data associated with the dates ranges for datasets A and B are conditional A and conditional B. The goal in this example is to determine, given the daily returns over two consecutive periods, whether the returns from those consecutive periods are from the same ticker symbol. In other words, given the daily returns for a first subgroup (dataset A) and the daily returns for a second subgroup (dataset B), how does system 100 and the example detectors shown in FIGS. 4-6 determine whether or not the subgroups are for the same ticker symbol or not. Or more generally, whether datasets A and B are anomalous with respect to each other.

As shown in FIG. 1, once the data is received from a data source 102 or otherwise provided to database 104, the data is processed by separator module 106 that splits the data into paired subgroups. In certain examples, the separator module may construct different subgroups (e.g., by pairing datasets together).

For this example, a 6-month sliding window will be used where dataset A (and corresponding conditional data) is over a 2 year term and dataset B (and corresponding conditional data) is over a 6 month term. With this information the separator module 106 may generate paired subgroups. For the further discussion of this example the following paired subgroups will be used: 1) dataset A with data from a start date of Jan. 1, 2013 to Jan. 1, 2015; and 2) dataset B with data from Jan. 1, 2015 to Jun. 30, 2015. Naturally other paired subgroups may also be generated over a sliding window. For example, another pair may include data from a start date of Jun. 1, 2013 to Jun. 1, 2015 and data from Jun. 1, 2015 to Dec. 31, 2015. Conditional data is also split and associated with the respective subgroups (e.g., S&P returns for the same period).

Once the data is split into two different datasets, then the paired datasets are passed to the one or more detectors that are to analyze the datasets. In this example, detectors 400, 500, and 600 will be used. The processing for each of these in connection with this example is provided below. The processing for each of the detectors may occur in parallel or may occur sequentially. In certain example embodiments, all of the detectors 108 may operate in parallel and independent of processing of the other ones of detectors 108. For example, detectors may be implemented by using virtual machines or virtual containers and upon request such detectors may be started or instantiated and then provided with the datasets that are of interest. In certain examples, the detectors for each pair of subgroups of a dataset (or multiple datasets) may operate in parallel.

For GAN detector 400, both the generator (412) and discriminator (414) network will be trained using the dataset A and conditional A. Specifically, the generator network is trained using the noise generated at 410, the conditional information 408, and the critic data that is returned from the discriminator network. Using these inputs the generator network 412 will try to generate synthetic returns for stock "A" (synthetic A) and the synthetic conditional information for that same time period (synthetic conditional A). The synthetic data is passed to the discriminator network 414 that will then try to distinguish whether the data it received is actually daily returns for stock A and the S&P500 or it is the generated data from the generator. This process continues until the discriminator network converges (e.g. has been trained).

Once the discriminator network 414 has converged then the GAN detector moves to detection and metric generation. For this processing a benchmark critic loss distribution is generated by using two sample sets of real daily returns from dataset A (x1 and x2) and corresponding conditional data. A test data critic loss distribution is also generated by using x1 of the real daily returns from dataset A and dataset B (along with corresponding conditional data). The distance between the benchmark critic loss distribution and the test data critic loss distribution is then calculated and passed to the evaluator module 110. The evaluator module 110 may then compare the received value that is (or is based on) the calculated distance to a threshold value to determine if x1 and X3 are for the same stock. In this example, the calculated distance is 0.6 (see FIG. 4B) which is greater than a threshold of 0.1. Accordingly, the evaluator module 110 determines that x1 and x3 are not the same.

The determination may be passed on to monitoring service 112 that may then issue an alert, log the determination to a database, or other additional actions.

In conjunction with processing performed by the GAN detector module 400, the separator module 106 may also send dataset A and dataset B and corresponding conditional data to the structural change detector module 500. Upon reception of the data, one HMM of the structural change detector module 500 will be trained using dataset A and conditional A. A second HMM will be trained on the concatenation of dataset A and dataset B and a concatenation of conditional A and conditional B.

Once both HMMs are trained, then the concatenation of dataset A and dataset B may be input back into the trained first and second HMMs. The result of this is shown in FIG. 5B where the output hidden state probabilities of both the trained HMMs are shown.

Next, a difference measurement is calculated between the two output hidden state probabilities as "mutual information." This value may be between 0 and 1, where a higher number indicates more similarity. In the case of datasets A and B, a difference measurement of 0.1 is calculated. This calculation is passed to the evaluator module 110 that compares it to a threshold. In this case the 0.1 difference measurement is compared against a threshold of 0.5. As the difference measurement is less than the threshold, the evaluator module 110 determines that dataset A and dataset B are not for the same ticker symbol.

The third of the three detectors in this example to operate on dataset A and dataset B is the time series detector 600. As discussed above this detector combines and autocorrelation detector 602 and a VAR detector 604. In this example, autocorrelation and partial autocorrelation is calculated for both dataset A and dataset B. These calculations involve using lags 1-10 as part of the calculation for the autocorrelation. These results are then used to bucktized the different lags and the result of this bucketing process is shown in the below Table 1 (showing data for the autocorrelation process).

TABLE 1

| Lag | Auto "A" | Auto "B" | Bucket "A" | Bucket "B" |
|---|---|---|---|---|
| 1 | 0.8358 | −0.7026 | 1 | −1 |
| 2 | −0.2961 | −0.5966 | 0 | −1 |
| 3 | 0.0500 | −0.2915 | 0 | 0 |

TABLE 1-continued

| Lag | Auto "A" | Auto "B" | Bucket "A" | Bucket "B" |
|---|---|---|---|---|
| 4 | 0.2002 | 0.5815 | 0 | 1 |
| 5 | 0.7563 | 0.8149 | 1 | 1 |
| 6 | 0.4020 | 0.5650 | 1 | 1 |
| 7 | 0.1722 | −0.9739 | 0 | −1 |
| 8 | −0.8888 | 0.4104 | −1 | 1 |
| 9 | 0.5726 | −0.3197 | 1 | 0 |
| 10 | 0.4519 | −0.4687 | 1 | −1 |

Each lag is compared separately and the difference measurement is a weighted average of KL the divergence. In this example, the KL divergence is 0.8, which indicates a p value of 0.001. This data is passed to evaluator module 110 that determines it is less than 0.05 and thus the evaluator module 110 determines there is a difference (e.g., that is significant) between datasets A and B (e.g., the daily returns in those datasets do not represent the same symbol).

The VAR detector 604 of the time series detector generates two new datasets. One is a concatenation (Concat 1) of A and B (represented as the "returns" column in Table 2 below) and another is a concatenation (Concat 2) of B and dummy data (represented as the interaction column in Table 2 below). From this data the returns and interaction columns are passed to VAR 618 and a regression is performed.

TABLE 2

| Date | Symbol | Returns | Dummy is Dataset 2 | Interaction |
|---|---|---|---|---|
| Dec. 25, 2014 | A | 0.009 | 0 | 0 |
| Dec. 26, 2014 | A | 0.042 | 0 | 0 |
| Dec. 27, 2014 | A | 0.007 | 0 | 0 |
| Dec. 28, 2014 | A | 0.042 | 0 | 0 |
| Dec. 29, 2014 | A | 0.000 | 0 | 0 |
| Dec. 30, 2014 | A | 0.034 | 0 | 0 |
| Dec. 31, 2014 | A | 0.039 | 0 | 0 |
| Jan. 1, 2015 | A | 0.010 | 0 | 0 |
| Jan. 2, 2015 | B | 0.035 | 1 | 0.035 |
| Jan. 3, 2015 | B | 0.036 | 1 | 0.036 |
| Jan. 4, 2015 | B | 0.025 | 1 | 0.025 |
| Jan. 5, 2015 | B | 0.022 | 1 | 0.022 |

If the resulting p value of the coefficient is then passed to the evaluator module 110. The evaluator module 110 may then determine that p values of less than 1% (0.01) are significant, which indicates that datasets A and B are not the same.

The various outputs from the detectors may thus be individually and/or jointly analyzed by the evaluator 110 to determine whether the datasets (or the two sub-datasets) are anomalous with respect to each other.

Description of FIG. 7

FIG. 7 is a block diagram of an example computing device 700 (which may also be referred to, for example, as a "computing device," "computer system," or "computing system") according to some embodiments. In some embodiments, the computing device 700 includes one or more of the following: one or more processors 702; one or more memory devices 704; one or more network interface devices 706; one or more display interfaces 708; and one or more user input adapters 710. Additionally, in some embodiments, the computing device 700 is connected to or includes a display device 712. As will explained below, these elements (e.g., the processors 702, memory devices 704, network interface devices 706, display interfaces 708, user input adapters 710, display device 712) are hardware devices (for example, electronic circuits or combinations of circuits) that are configured to perform various different functions for the computing device 700.

In some embodiments, each or any of the processors 702 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 702 uses an instruction set architecture such as x86 or Advanced RISC Machine (ARM). Processors 702 are an example of a hardware processor. In certain example embodiments, one or more of processors 702 may be included or be part of a processing system.

In some embodiments, each or any of the memory devices 704 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 702). Memory devices 704 are examples of non-volatile computer-readable storage media.

In some embodiments, each or any of the network interface devices 706 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 708 is or includes one or more circuits that receive data from the processors 702, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 712, which displays the image data. Alternatively or additionally, in some embodiments, each or any of the display interfaces 708 is or includes, for example, a video card, video adapter, or graphics processing unit (GPU).

In some embodiments, each or any of the user input adapters 710 is or includes one or more circuits that receive and process user input data from one or more user input devices (not shown in FIG. 7) that are included in, attached to, or otherwise in communication with the computing device 700, and that output data based on the received input data to the processors 702. Alternatively or additionally, in some embodiments each or any of the user input adapters 710 is or includes, for example, a PS/2 interface, a USB interface, a touchscreen controller, or the like; and/or the user input adapters 710 facilitates input from user input devices (not shown in FIG. 7) such as, for example, a keyboard, mouse, trackpad, touchscreen, etc. . . .

In some embodiments, the display device 712 may be a Liquid Crystal Display (LCD) display, Light Emitting Diode (LED) display, or other type of display device. In embodiments where the display device 712 is a component of the computing device 700 (e.g., the computing device and the display device are included in a unified housing), the display device 712 may be a touchscreen display or non-touchscreen display. In embodiments where the display device 712 is connected to the computing device 700 (e.g., is external to the computing device 700 and communicates with the computing device 700 via a wire and/or via wireless communication technology), the display device 712 is, for example, an external monitor, projector, television, display screen, etc.

In various embodiments, the computing device 700 includes one, or two, or three, four, or more of each or any of the above-mentioned elements (e.g., the processors 702, memory devices 704, network interface devices 706, display interfaces 708, and user input adapters 710). Alternatively or additionally, in some embodiments, the computing device 700 includes one or more of: a processing system that includes the processors 702; a memory or storage system that includes the memory devices 704; and a network interface system that includes the network interface devices 706.

The computing device 700 may be arranged, in various embodiments, in many different ways. As just one example, the computing device 700 may be arranged such that the processors 702 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 700 may be arranged such that: the processors 702 include two, three, four, five, or more multi-core processors; the network interface devices 706 include a first network interface device that implements Ethernet and a second network interface device that implements WiFi and/or Bluetooth; and the memory devices 704 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the [ separator module 106, detectors 108(a-c), GAN Detector 400, Structural Change Detector 500, Timer Series Detector 600, evaluator module 110, monitoring service 112, database 104, data source 102, training module 402, detection module 404, generator network 412, discriminator network 414 (and trained version thereof), HMM 522a/522b, HMM 524a/524b, training module 502, detection module 504, Autocorrelation Detector 602, partial autocorrelation function 612, autocorrelation function 610, bucketizer 614, VAR detector 604, indicator function 616, Vector auto-regression 618, and system 100, each of which will be referred to individually for clarity as a "component" for the remainder of this paragraph, are implemented using an example of the computing device 700 of FIG. 5. In such embodiments, the following applies for each component: (a) the elements of the 700 computing device 700 shown in FIG. 7 (i.e., the one or more processors 702, one or more memory devices 704, one or more network interface devices 706, one or more display interfaces 708, and one or more user input adapters 710), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 704 (e.g., in various embodiments, in a volatile memory device such as a RAM or an instruction register and/or in a non-volatile memory device such as a flash memory or hard disk) and all actions described herein as performed by the software modules are performed by the processors 702 in conjunction with, as appropriate, the other elements in and/or connected to the computing device 700 (i.e., the network interface devices 706, display interfaces 708, user input adapters 710, and/or display device 712); (c) alternatively or additionally, to the extent it is described herein that the component processes and/or otherwise handles data, in some embodiments, such data is stored in the memory devices 704 (e.g., in some embodiments, in a volatile memory device such as a RAM and/or in a non-volatile memory device such as a flash memory or hard disk) and/or is processed/handled by the processors 702 in conjunction, as appropriate, the other elements in and/or connected to the computing device 700 (i.e., the network interface devices 706, display interfaces 708, user input adapters 710, and/or display device 512); (d) alternatively or additionally, in some embodiments, the memory devices 702 store instructions that, when executed by the processors 702, cause the processors 702 to perform, in conjunction with, as appropriate, the other elements in and/or connected to the computing device 700 (i.e., the memory devices 704, network interface devices 706, display interfaces 708, user input adapters 710, and/or display device 512), each or any combination of actions described herein as performed by the component and/or by any software modules described herein as included within the component.

Consistent with the preceding paragraph, as one example, in an embodiment where an instance of the computing device 700 is used to implement system 100, the memory devices 704 could store database 104, and/or store the data described herein as processed and/or otherwise handled by the detectors described herein. Processors 702 could be used to operate the detectors (e.g., any of those described in connection with 108 and/or 400, 500, or 600), separate module 106, and/or evaluator module 110, and/or otherwise process the data described herein as processed by the system, separator module, detector module, or evaluator module.

The hardware configurations shown in FIG. 7 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 7, (e) via other hardware arrangements, architectures, and configurations, and/or via combinations of the technology described in (a) through (e).

Technical Advantages of Described Subject Matter

In certain example embodiments, the techniques described herein provide for model detection that is unsupervised and/or bi-directional. In other words, a user (or the system) does not need to define or know which of the two datasets are normal/correct in order to execute the techniques herein. Rather, either of dataset 1 or dataset 2 can be "abnormal" when comparing one to the other as is no directional inference involved in the detection process.

Model detection may be achieved using a data point comparison instead of a dataset comparison. In certain example embodiments, multiple different types of detectors (e.g., that each view or process the datasets in a different manner) are combined to allow for a flexible approach to detecting data changes from data sources. Each of the differently applied detectors can be used to provide increased confidence and/or visibility into whether changes within the dataset are statistically significant and warrant being labeled as indicating fraud or other purposeful changes in how the dataset is being generated.

In certain example embodiments, a time series detector is provided. It advantageously uses a combination of statistic and econometric models. This may allow for improved accuracy and/or a more complete view of the time series characteristics, since the detector is able to look at the time series separately and in combination.

The time series detector may also advantageously use a bucketizer and difference measurement design. Such a design may add flexibility to the overall system by providing the user with the ability to customize the granularity of the distribution by adjusting the number of buckets to use in the bucketizer based on a given use case. It also may allow for adjustment of the power of the detector so as to avoid too many "false alarms." The time series detector may also advantageously use dummy variables to emphasize the data in a dataset.

In certain example embodiments, a structural change detector is provided that makes use of Hidden Markov Models (HMM). Application of HMMs in certain example embodiments can help to reveal the hidden/unobserved patterns behind the data by inferring the hidden states and transitional probabilities. This may allow for further dives down into the data generating process that reduces the noise in input data before detection. This can result in a more robust process with increased confidence in judgment.

In certain example embodiments, the GAN detector (or AI detector) is provided. This detector uses generative adversarial models (networks) and makes use of the discriminator model (network) from the GAN. The discriminator model is used to generate a difference measurement between the two datasets (A & B).

The features herein advantageously allow for detecting various types of changes, anomalies, and/or inconsistencies (e.g., those that are statistically significant) in data that is provided from one or more data sources—especially data sources that obscure how they process input data to generate their output data. Such techniques may be used to detect whether the changes in a given dataset are statistically inconsistent In other words, the changes within the dataset are statistically significant such that mere chance would likely not be the cause of the changes. Using the multiple different type of detectors, the techniques herein thus provide a technical process for detecting changes in so-called black box processing without expressly knowing what occurs inside the "black box." In other words, even though the processing within the black box (e.g., an external computer system) may not be known, the technical implementations herein may allow one to infer that some change has been implemented within the black box.

In certain example embodiments, improvements for detecting when historical data has been altered (e.g., to improve the output) for a service (e.g., a black box service) may be based on using a coverage detector and/or a distribution shift detector as described herein.

In certain example embodiments, improvements for detecting when an underlying process or model has been changed (e.g., to produce better output results) for a service may be based on using a time series detector, a structural change detector and/or a GAN detector as described herein. Using plural of such detectors may further increase the accuracy of such detections as the different detectors may provide different types of determinations (e.g., insights) into how the data has (or has not) changed.

In certain example embodiments, improvements for detecting when the performance of a process, service, or model has changed (e.g., the predicative nature of a model has deteriorated) may be based on using a performance detector as described herein.

The techniques herein may allow for more efficiently processing large amounts of data (e.g., the amount of which would be impossible for a human to analyze) using the described detectors in order to detect small, subtle, non-obvious, or other changes in such data. Such data may include thousands, millions, or even billions of different data points. Using multiple different types of detectors to assess the same dataset may also improve the accuracy as compared to using a single detector.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-6, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system for detecting changes within datasets supplied from external data sources, the computer system comprising:
   a transceiver configured to receive a dataset that is generated by at least one external computer system, the dataset comprises time series data;
   a processing system that includes at least one processor, the processing system configured to:
   separate the dataset into a plurality of different dataset pairs, the plurality of different dataset pairs including a first dataset pair of at least first and second datasets, wherein the first dataset corresponds to a first time frame over the time series data and the second dataset corresponds to a second time frame, which is different from the first time frame, over the time series data;
   execute a plurality of different detector processes using, as input for each respective one of the plurality of different detector processes, the first and second data sets, wherein the plurality of different detector processes includes at least a first detector process and a second detector process that each use different processing models for processing the inputted first and second data sets, wherein the first and second detector processes respectively generate, as output, first and second metrics of a level of difference between the time series data within the first time frame to the time series data within the second time frame, wherein the plurality of different detector processes are executed for the plurality of different dataset pairs;

perform a comparison of the first and second metrics to at least one threshold value; and determine, by using the performed comparison, whether there is a statistically significant change in data within the first dataset as compared to the data within the second dataset based on the performed comparison.

2. The computer system of claim 1, wherein the first and second datasets are separated based on a time factor.

3. The computer system of claim 1, wherein the processing system is further configured to execute the plurality of different detector processes in parallel.

4. The computer system of claim 1, wherein at least one of the plurality of different detector processes includes, when executed by the processing system, operations that include:

using a generative neural network to train a discriminative neural network by using the first data set; and upon convergence of the discriminative neural network, using the trained discriminative neural network to measure a level of difference between the first dataset and the second dataset.

5. The computer system of claim 4, wherein the at least one of the plurality of different detector processes further includes, when executed by the processing system, operations that include:

selecting third and fourth datasets that are both subsets of the first dataset;

generating a first critic loss distribution by applying the third and fourth datasets to the trained discriminative neural network; and generating a second critic loss distribution by applying the third dataset and the second dataset to the trained discriminative neural network.

6. The computer system of claim 5, wherein the at least one of the plurality of different detector processes further includes, when executed by the processing system, operations that include:

calculating a distance between the first critic loss distribution and the second critic loss distribution, wherein the at least one metric for the at least one of the plurality of different detector processes is based on the calculated distance.

7. The computer system of claim 6, wherein the distance is calculated as a Kullback-Leibler (KL) divergence.

8. The computer system of claim 1, wherein at least one of the plurality of different detector processes includes, when executed by the processing system, operations that include:

using a generative adversarial network to train a discriminator network by using the first dataset as input; and use the discriminator network that has been trained to measure a level of difference between the first dataset and the second dataset.

9. The computer system of claim 1, wherein at least one of the plurality of different detector processes includes, when executed by the processing system, operations that include:

executing, for different lags, an autocorrelation function over the first and second datasets;

bucketizing results of the autocorrelation; and calculating a weighted average KL divergence based on the bucketized results.

10. The computer system of claim 9, wherein at least one of the plurality of different detector processes includes, when executed by the processing system, operations that include:

executing, for different lags, a partial autocorrelation function over the first and second datasets.

11. The computer system of claim 1, wherein at least one of the plurality of different detector processes includes, when executed by the processing system, operations that include:

concatenating the first and second datasets together to form a first concatenated dataset;

concatenating the second dataset with dummy data to form a second concatenated dataset;

performing vector auto-regression (VAR) based on the first and second concatenated datasets; and determining a significance level of dummy interaction based on performed vector auto-regression, wherein the at least one metric for the at least one of the plurality of different detector processes is based on the determined significance level.

12. The computer system of claim 1, wherein at least one of the plurality of different detector processes includes, when executed by the processing system, operations that include:

generating a third dataset by concatenating the first and second dataset;

training, using the first data set, a first Hidden Markov model (HMM);

training, using the third dataset, a second HMI;

generating first and second hidden state probabilities by applying the second dataset to the trained first and second HMIs; and calculating a distance value between the first and second hidden state probabilities, wherein the at least one metric for the at least one of the plurality of different detector processes is based on the calculated distance value.

13. The computer system of claim 1, wherein the at least one threshold value includes first and second threshold values that are different from one another and that are respectively used for comparison to the first and second metrics.

14. The computer system of claim 1, wherein the plurality of different detector processes include at least two of: a coverage detector, a distribution shift detector, a time series detector, a structural change detector that includes at least one hidden markov model, a general adversarial network, and a performance detector.

15. A method of detecting changes within a dataset provided from an external computer system that generates the dataset using a black-box process, the method comprising:

receiving the dataset from the external computer system, the dataset comprising time series data;

obtaining, from the dataset, a plurality of different dataset pairs, the plurality of different dataset pairs including a first dataset pair of at least first and second datasets, wherein the first dataset corresponds to a first time frame over the time series data and the second dataset corresponds to a second time frame, which is different from the first time frame, over the time series data;

executing a plurality of different detector processes against the first and second data sets, wherein the plurality of different detector processes includes at least a first detector process and a second detector process, wherein the first and second detector processes use different processing models to process the first and second datasets, wherein the plurality of different detector processes are executed for the plurality of different dataset pairs;

generating, by the first detector process, a first metric that corresponds to a level of difference between the time series data within the first time frame to the time series data within the second time frame that are processed by the first detector process;

generating, by the second detector process, a second metric that corresponds to a level of difference between the time series data within the first time frame to the time series data within the second time frame that are processed by the second detector process;

comparing the first and second metrics to at least one threshold value; and determining, based on the comparison of the first and second metrics, whether there is a statistically significant change between the first and second datasets based on the comparison.

16. The method of claim 15, wherein at least one of the plurality of different detector processes includes:

using a generative neural network to train a discriminative neural network by using the first data set; and upon convergence of the discriminative neural network, using the trained discriminative neural network to measure a level of difference between the first dataset and the second dataset.

17. The method of claim 16, wherein the at least one of the plurality of different detector processes further includes:

selecting third and fourth datasets that are both subsets of the first dataset;

generating a first critic loss distribution by applying the third and fourth datasets to the trained discriminative neural network; and generating a second critic loss distribution by applying the third dataset and the second dataset to the trained discriminative neural network.

18. The method of claim 15, wherein at least one of the plurality of different detector processes includes:

executing, for different lags, an autocorrelation function over the first and second datasets;

executing, for different lags, a partial autocorrelation function over the first and second datasets;

bucketizing results of the autocorrelation and partial autocorrelations functions; and calculating a weighted average KL divergence based on the bucketized results.

19. The method of claim 15, wherein at least one of the plurality of different detector processes includes:

generating a third dataset by appending a second dataset to a first dataset;

training, using the first data set, a first Hidden Markov model (HMM);

training, using the third dataset, a second HMI;

generating first and second hidden state probabilities by applying the second dataset to the trained first and second HMIs; and calculating a distance value between the first and second hidden state probabilities, wherein the at least one metric for the at least one of the plurality of different detector processes is based on the distance value.

20. A non-transitory computer readable storage medium storing a computer program for use with a computer system, the computer program comprising instructions that, when executed by the computer system, cause the computer system to perform operations comprising:

separating a dataset into a plurality of different dataset pairs, the plurality of different dataset pairs including a first dataset pair of at least first and second datasets, the dataset being generated by an external computer system via a black-box process, the dataset comprising time series data, wherein the first dataset corresponds to a first time frame over the time series data and the second dataset corresponds to a second time frame, which is different from the first time frame, over the time series data;

executing a plurality of different detector processes against the first and second data sets, wherein the plurality of different detector processes includes at least a first detector process and a second detector process, wherein the first and second detector processes use different processing models to process the first and second datasets, wherein the plurality of different detector processes are executed for the plurality of different dataset pairs;

generating, by the first detector process, a first metric that corresponds to a level of difference between the time series data within the first time frame to the time series data within the first time frame that are processed by the first detector process;

generating, by the second detector process, a second metric that corresponds to a level of difference between the time series data within the first time frame to the time series data within the second time frame that are processed by the second detector process;

comparing the first and second metrics to at least one threshold value; and storing at least one value that represents a determination, by using the comparison, for whether there is a statistically significant change between the first and second datasets that have been produced by the same black-box process.

* * * * *